United States Patent
Fullerton et al.

(10) Patent No.: US 9,412,506 B2
(45) Date of Patent: Aug. 9, 2016

(54) SYSTEM AND METHOD FOR TAILORING MAGNETIC FORCES

(71) Applicant: Correlated Magnetics Research, LLC., Huntsville, AL (US)

(72) Inventors: Larry W. Fullerton, New Hope, AL (US); Mark D. Roberts, Huntsville, AL (US); David P. Machado, Harvest, AL (US); Jason N. Morgan, Brownsboro, AL (US)

(73) Assignee: Correlated Magnetics Research, LLC., Huntsville, AL (US)

( * ) Notice: Subject to any disclaimer, the term of this patent is extended or adjusted under 35 U.S.C. 154(b) by 0 days.

(21) Appl. No.: 14/882,190

(22) Filed: Oct. 13, 2015

(65) Prior Publication Data

US 2016/0180997 A1    Jun. 23, 2016

Related U.S. Application Data

(63) Continuation of application No. 14/808,770, filed on Jul. 24, 2015, which is a continuation-in-part of application No. 14/578,349, filed on Dec. 20, 2014, now Pat. No. 9,111,672, which is a continuation of application No. 14/061,956, filed on Oct. 24, 2013, now Pat. No. 8,947,185, which is a continuation of application No. 13/892,246, filed on May 11, 2013, now Pat. No. 8,570,130, which is a continuation of application No. 13/465,001, filed on May 6, 2012, now Pat. No. 8,471,658, which is a continuation of application No. 13/179,759, filed on Jul. 11, 2011, now Pat. No. 8,174,347, which is a continuation-in-part of application No. 12/885,450, filed on Sep. 18, 2010, now Pat. No. 7,982,568.

(60) Provisional application No. 62/175,865, filed on Jun. 15, 2015, provisional application No. 61/399,448, filed on Jul. 12, 2010, provisional application No. 61/277,214, filed on Sep. 22, 2009, provisional application No. 61/277,900, filed on Sep. 30, 2009, provisional application No. 61/278,767, filed on Oct. 9, 2009, provisional application No. 61/279,094, filed on Oct. 16, 2009, provisional application No. 61/281,160, filed on Nov. 13, 2009, provisional application No. 61/283,780, filed on Dec. 9, 2009, provisional application No. 61/284,385, filed on Dec. 17, 2009, provisional application No. 61/342,988, filed on Apr. 22, 2010.

(51) Int. Cl.
*H01F 7/20* (2006.01)
*H01F 7/02* (2006.01)

(52) U.S. Cl.
CPC ............ *H01F 7/0231* (2013.01); *H01F 7/0252* (2013.01); *H01F 7/20* (2013.01)

(58) Field of Classification Search
CPC ............................. H01F 7/0231; H01F 7/0252
USPC ........................................................ 335/306
See application file for complete search history.

(56) References Cited

U.S. PATENT DOCUMENTS 4,912,727 A * 3/1990 Schubert ................ A47B 88/08
248/206.5

*Primary Examiner* — Ramon M Barrera
(74) *Attorney, Agent, or Firm* — Vector IP Law Group; Robert S. Babayi

(57) ABSTRACT

A magnetic system described herein includes first and second magnetic structures that simultaneously produce repel forces and attract forces that combine to produce a composite force that can be an attract force, a repel force, or a force that transitions from an attract force to a repel force.

16 Claims, 24 Drawing Sheets

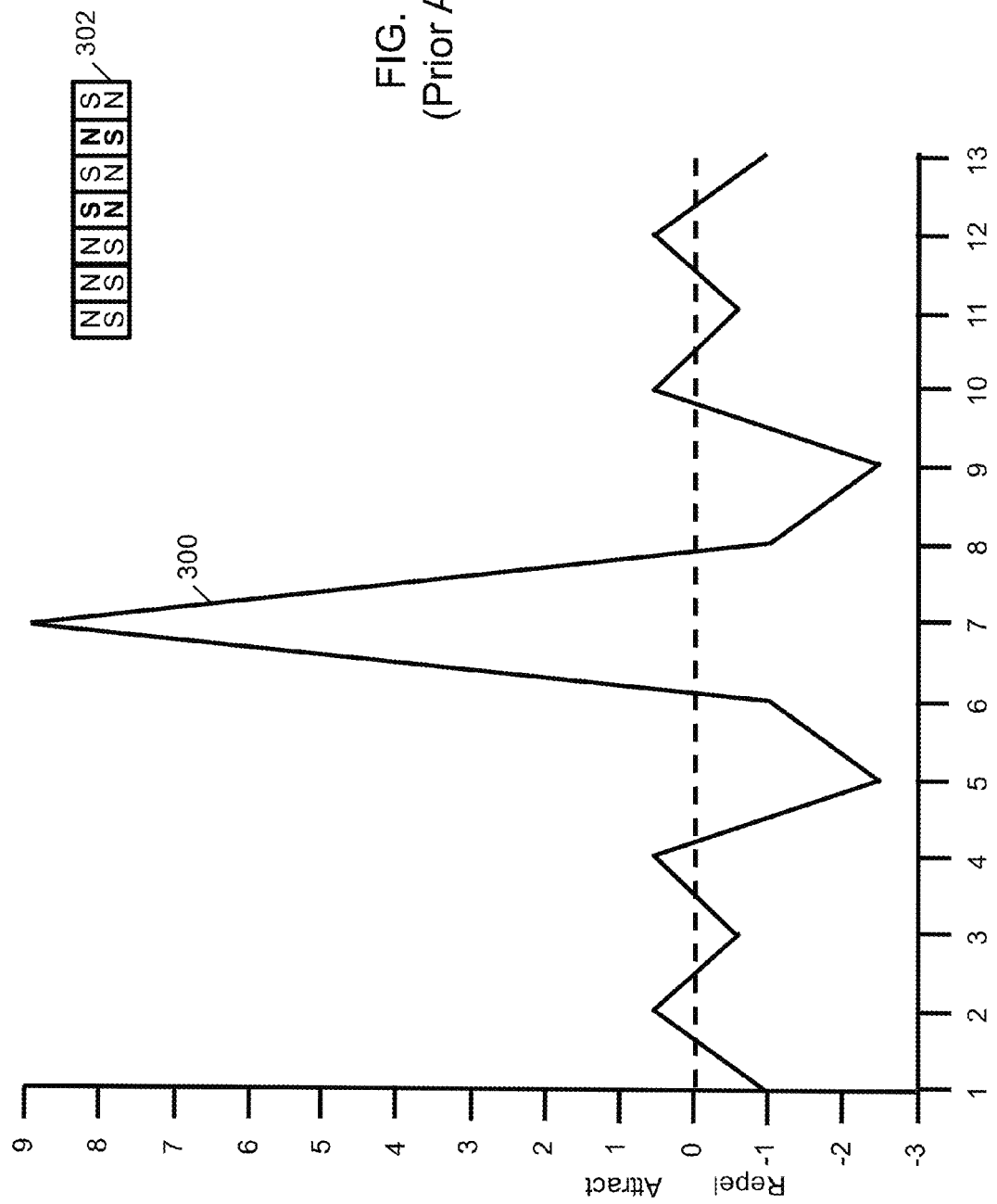

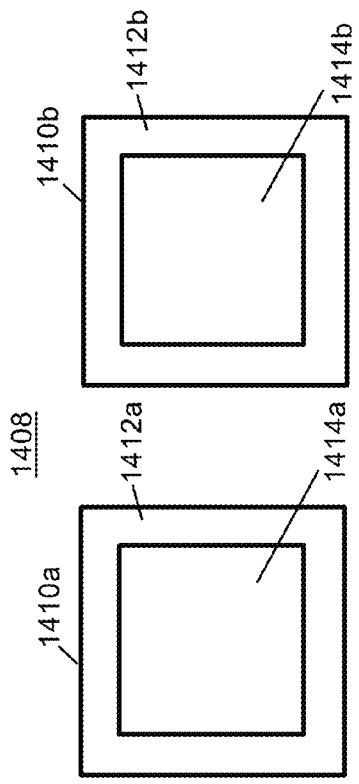
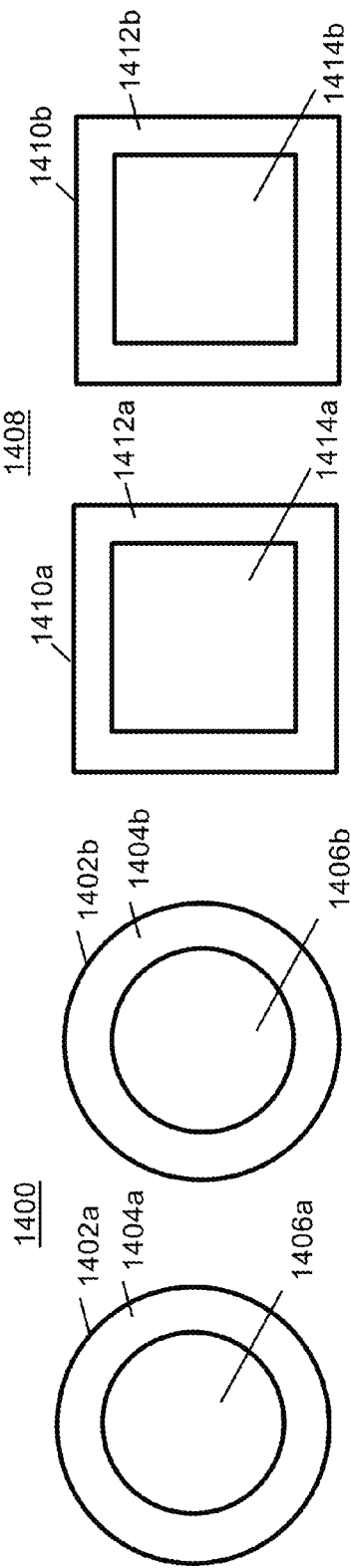
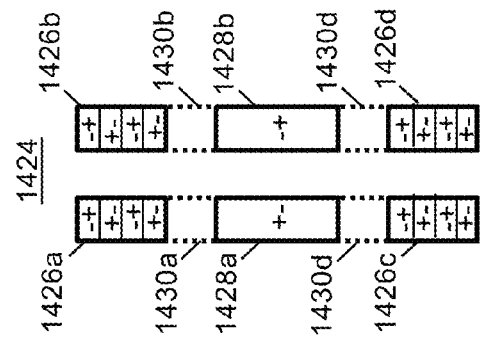
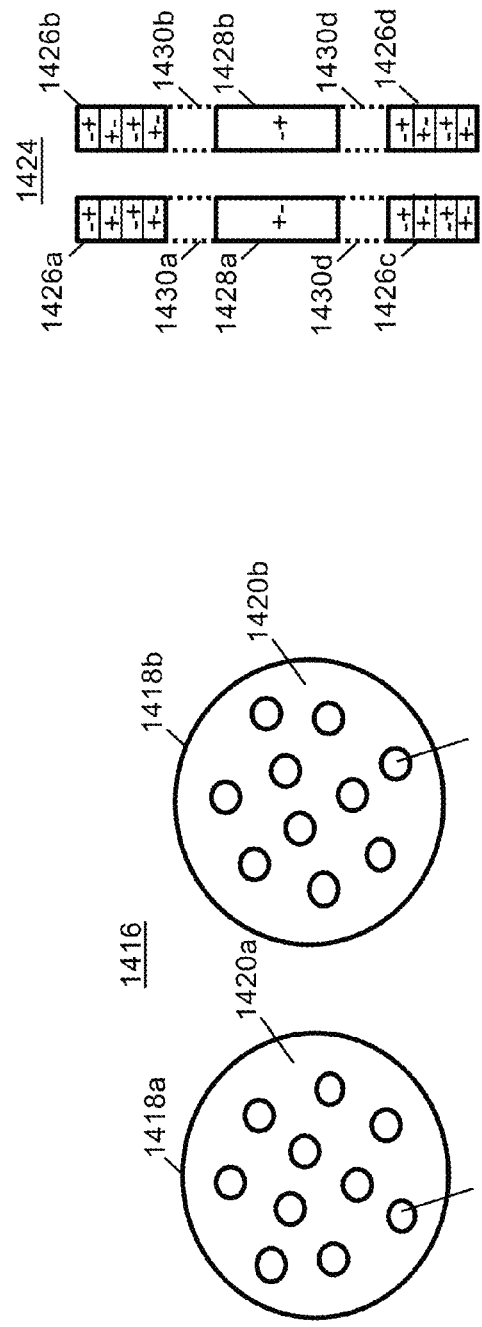

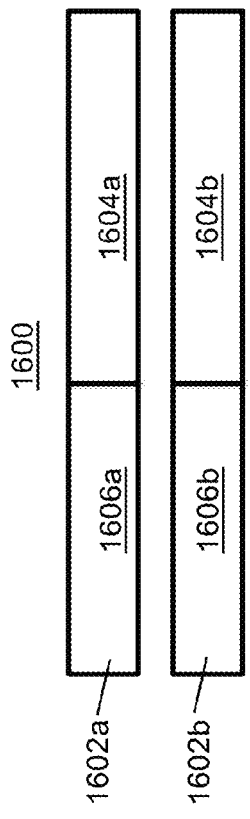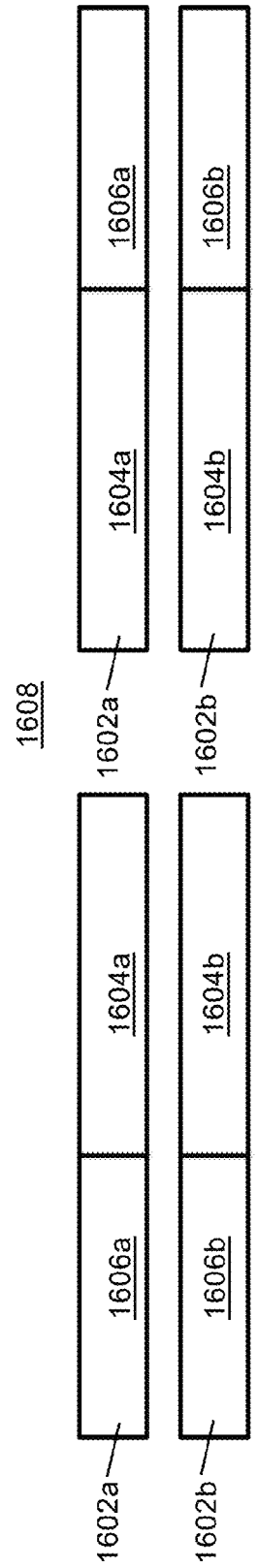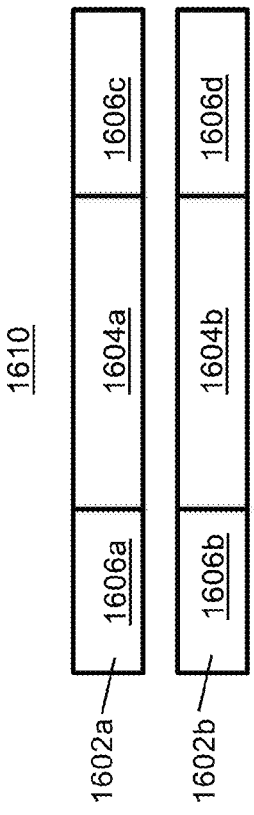

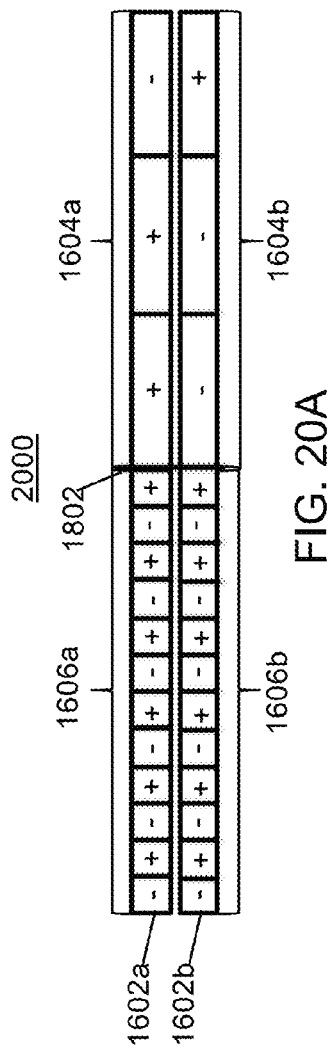
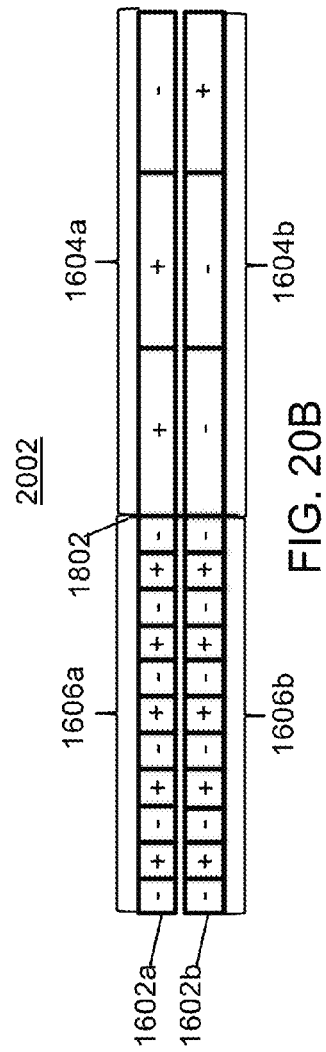
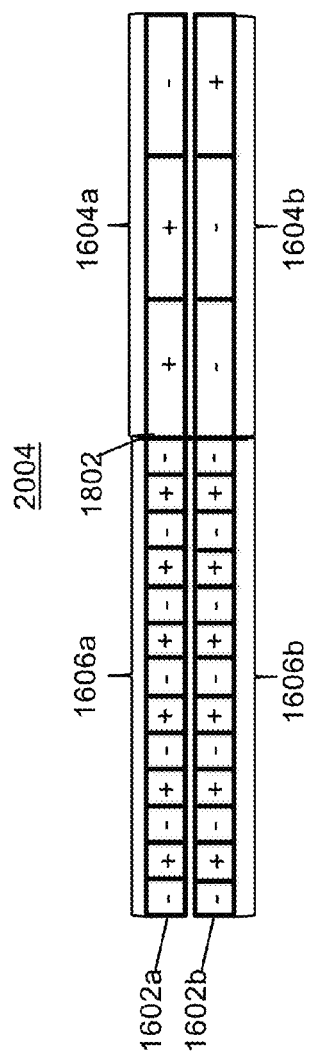

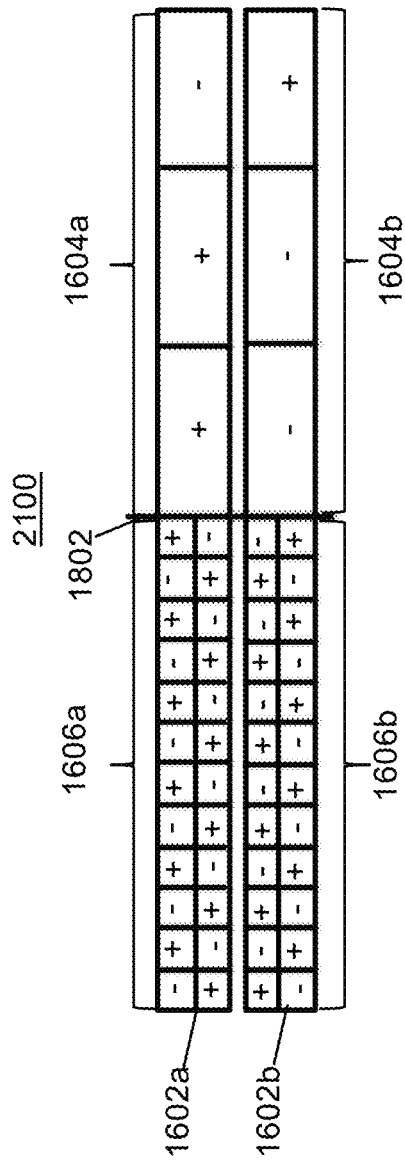
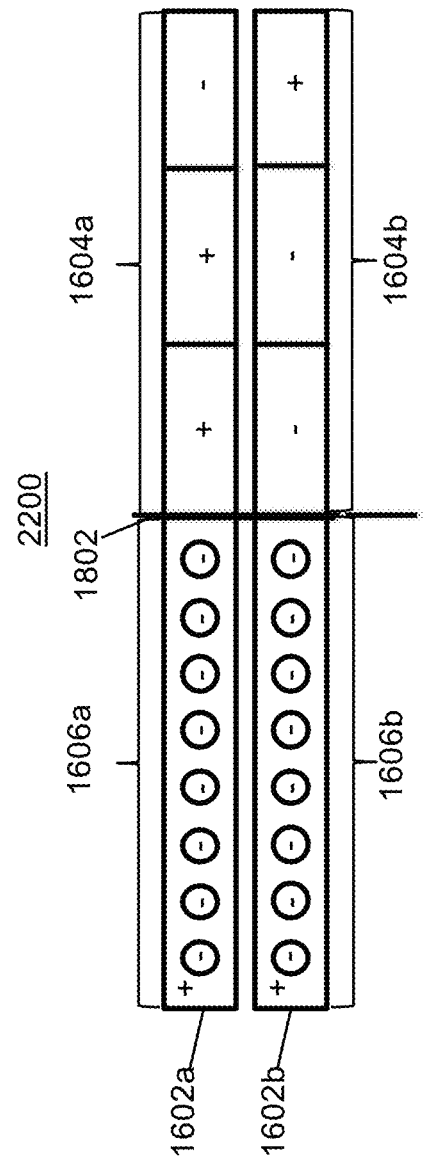

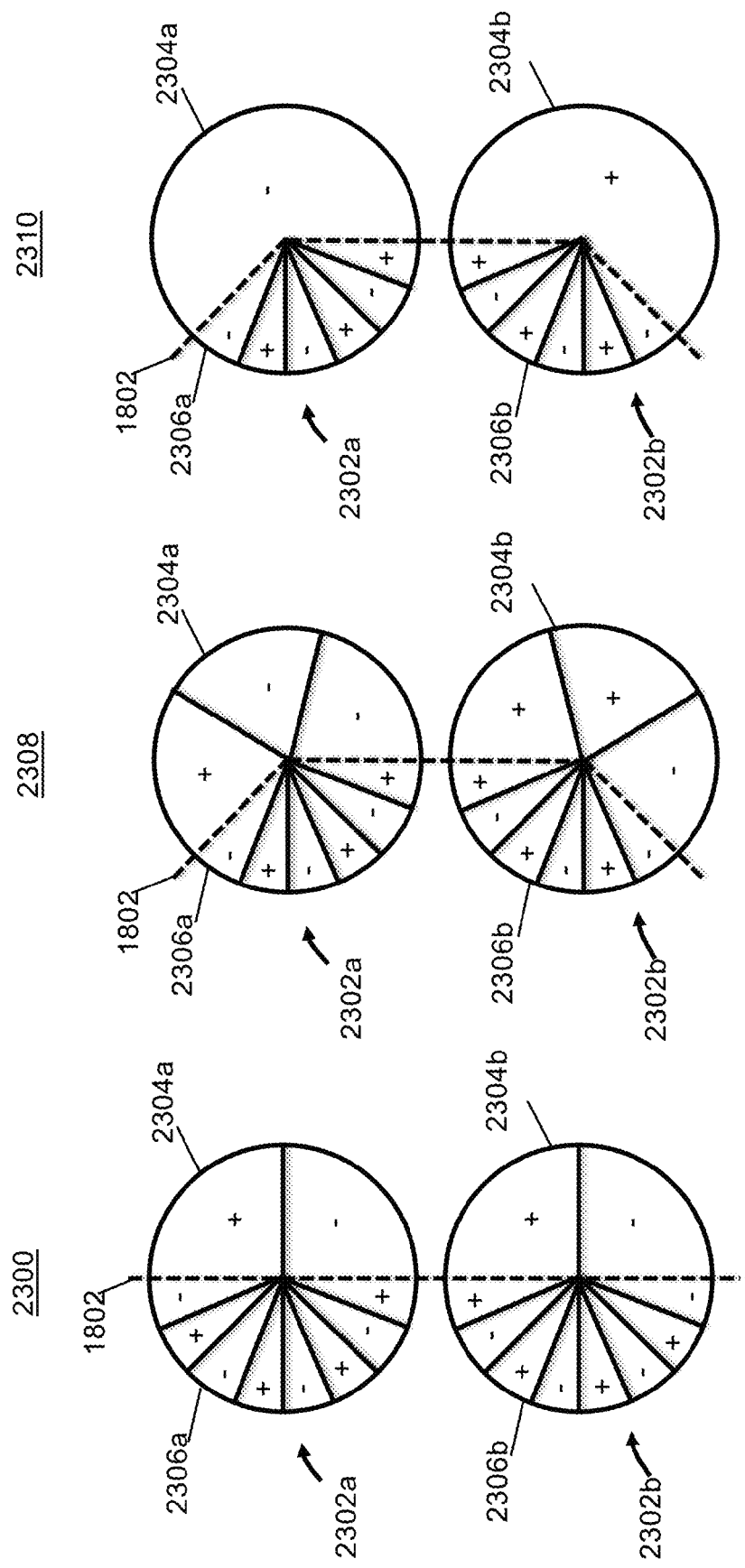

SYSTEM AND METHOD FOR TAILORING MAGNETIC FORCES

RELATED APPLICATIONS

This patent application is a continuation application of U.S. patent application Ser. No. 14/808,770, filed Jul. 24, 2015, now pending, which is a continuation-in-part application of U.S. patent application Ser. No. 14/578,349, filed Dec. 20, 2014, now pending, and claims the benefit under 35 USC 119(e) of provisional application 62/175,865, titled "System and Method for Tailoring Magnetic Forces", filed Jun. 15, 2015 by Fullerton et al.; Ser. No. 14/578,349 is a continuation application of U.S. patent application Ser. No. 14/061,956, filed Oct. 24, 2013, now U.S. Pat. No. 8,947,185, which is a continuation application of U.S. patent application Ser. No. 13/892,246, filed May 11, 2013, now U.S. Pat. No. 9,570,130, which is a continuation application of U.S. patent application Ser. No. 13/465,001, filed May 6, 2012, now U.S. Pat. No. 8,471,658, which is a continuation of U.S. patent application Ser. No. 13/179,759, filed Jul. 11, 2011, now U.S. Pat. No. 8,174,347, which claimed the benefit of U.S. Provisional Application Ser. No. 61/399,448 (filed Jul. 12, 2010) and is a continuation-in-part of U.S. Nonprovisional patent application Ser. No. 12/885,450 (filed Sep. 18, 2010), now U.S. Pat. No. 7,982,568, which claims the benefit of U.S. provisional patent applications 61/277,214 (filed Sep. 22, 2009), 61/277,900 (filed Sep. 30, 2009), 61/278,767 (filed Oct. 9, 2009), 61/279,094 (filed Oct. 16, 2009), 61/281,160 (filed Nov. 13, 2009), 61/283,780 (filed Dec. 9, 2009), 61/284,385 (filed Dec. 17, 2009), and 61/342,988 (filed Apr. 22, 2010). The contents of these documents are hereby incorporated by reference herein.

FIELD OF THE INVENTION

The present invention relates generally to a magnetic system. More particularly, the invention relates to a magnetic system where repel forces and attract forces are produced simultaneously such that a repel force curve and an attract force curve are combined to produce a composite force curve.

SUMMARY OF THE INVENTION

In one aspect, the present invention provides a magnetic system comprising a first magnetizable material comprising a first polarity pattern comprising a first plurality of polarity regions and a second magnetizable material comprising a second polarity pattern comprising a second plurality of polarity regions, where when the first magnetizable material is aligned with the second magnetizable material, the first polarity pattern and second polarity pattern produce a composite magnetic force curve, the composite magnetic force curve comprising a first magnetic force curve with a first extinction rate and a second magnetic force curve with a second extinction rate.

The composite magnetic force curve can be an attract force where the first magnetic force curve is an attract force and the second magnetic force curve is a repel force where the first extinction rate is greater than the second extinction rate.

The first magnetizable material can be moveable relative to the second magnetizable material in at least two dimensions for a first portion of the composite first curve.

The first magnetizable material can be moveable relative to the second magnetizable material in only one dimension for a second portion of the composite first curve.

In another aspect, the present invention provides a magnetic system comprising a first magnetizable material having a first portion having a first alternating polarity pattern and a second portion having a second alternating polarity pattern, where when the first magnetizable material is aligned with a second magnetizable material the first and second magnetizable material produce magnetic forces in accordance with a composite force curve comprising a first force curve having a first extinction rate and a second force curve having a second extinction rate greater than the first extinction rate.

In yet another aspect, the present invention provides a magnetic system comprising a first portion of a first magnetizable material having a first alternating polarity pattern having only two polarity regions, and a second portion of the first magnetizable material having a second alternating polarity pattern having three or more polarity regions, wherein when the first magnetizable material is aligned with a second magnetizable material the first and second magnetizable material produce magnetic forces in accordance with a composite force curve comprising a first force curve and a second force curve.

The first magnetizable material can be capable of being misaligned relative to the second magnetizable material.

The first force curve can be configured to align the first magnetizable material to the second magnetizable material.

In still another aspect, the present invention provides a magnetic system comprising a first portion of a first magnetizable material having a first polarity pattern and a second portion of the first magnetizable material having a second polarity pattern, where when the first magnetizable material is aligned with a second magnetizable material the first and second magnetizable material produce magnetic forces in accordance with a composite force curve comprising a first force curve having a first extinction rate and a second force curve having a second extinction rate greater than the first extinction rate, wherein the first magnetizable material is moveable relative to the second magnetizable material in at least two dimensions.

In a further aspect, the present invention provides a magnetic attachment system, comprising a magnetizable material having a first plurality of regions having a first polarity pattern and having a second plurality of regions having a second polarity pattern, where when the magnetizable material is aligned with another magnetizable material the magnetizable material and the another magnetizable material produce magnetic forces in accordance with a composite force curve, wherein the magnetizable material is moveable relative to the another magnetizable material in at least two dimensions for a first portion of the composite first curve and the magnetizable material is moveable relative to the another magnetizable material in only one dimension for a second portion of the composite first curve.

In an additional aspect, the present invention provides a magnetic system comprising a first portion of a first magnetizable material having a first polarity pattern and a second portion of the first magnetizable material having a second polarity pattern, where when the first magnetizable material is aligned with a second magnetizable material the first and second magnetizable materials produce magnetic forces in accordance with a repel force curve and a first attract force curve that combine to produce a composite force curve that is a second attract force curve.

The second attract force curve can include an inflection point.

The first attract force curve can have a first peak attract force and the second attract force curve can have a second peak attract force that is less than the first peak attract force.

In another additional aspect, the present invention provides a magnetic system comprising a first magnetizable material and a second magnetizable material, the first magnetizable material and the second magnetizable material producing a repel force curve and a first attract force curve that combine to produce a composite force curve that is a second attract force curve having a first attract force at a first separation distance and a second attract force at a second separation distance, and wherein the second separation distance is less than the first separation distance and the second attract force is less than the first attract force.

In a first portion of the composite force curve, the first magnetizable material can be moveable relative to the second magnetizable material in at least two dimensions and, in a second portion of the composite force curve, the first magnetizable material can be movable relative to the second magnetizable material in only one dimension.

In another additional aspect, the present invention provides a magnetic system comprising a first magnetized material and a second magnetized material, the first magnetized material and the second magnetized material configured to produce a repel force curve and a first attract force curve that combine to produce a composite force curve that is a second attract force curve having an inflection point.

In a different aspect, the present invention provides a magnetic system comprising a first magnetizable material having a first alternating polarity pattern having a first code density and a second magnetizable material having a second alternating polarity pattern having a second code density greater than the first code density, the first magnetizable material and the second magnetizable material being magnetized to produce a composite force curve having an inflection point.

The composite force curve can be an attract force curve.

The composite force curve can be a repel force curve.

The composite force curve may include a transition from a repel force curve to an attract force curve.

In another different aspect, the present invention provides a magnetizable material comprising a first polarity pattern and a second polarity pattern, where when the magnetizable material is aligned with another magnetizable material the magnetizable material and the another magnetizable material produce attract and repel magnetic forces in accordance with a composite force curve that is an attract force curve.

In yet another different aspect, the present invention provides a magnetic system comprising a first magnetizable material having a first polarity pattern and a second magnetizable material having the first polarity pattern, the first magnetizable material and the second magnetizable material each producing a repel force curve and an attract force curve that combine to produce a first composite force curve, a third magnetizable material having a second polarity pattern, and a fourth magnetizable material having the second polarity pattern, the third magnetizable material and the fourth magnetizable material each producing a repel force curve and an attract force curve that combine to produce a second composite force curve, the first and second magnetizable materials being attached to a first object in a line with a spacing between the first and second magnetizable materials, the third and fourth magnetizable materials being attached to a second object in a line with a spacing between the third and fourth magnetizable materials, and wherein when the first object and the second object are aligned, the first composite force curve and the second composite force curve combine to produce a third composite force curve.

The first polarity pattern of the first magnetizable material can be in reversed order than the first polarity pattern of the second magnetizable material.

The first magnetizable material and the second magnetizable material can be disposed on a plane.

Each of the repel force curves can comprise a first extinction rate and each of the attract force curves can comprise a second extinction rate greater than the first extinction rate.

In still another different aspect, the present invention provides a magnetic system comprising a first magnetizable material having a first polarity pattern and a second magnetizable material having the first polarity pattern, the first magnetizable material and the second magnetizable material each producing a repel force curve and an attract force curve that combine to produce a composite force curve when aligned with a third magnetizable material and a fourth magnetizable material each having a second polarity pattern, the first and second magnetizable materials being attached to a first object in a line with a first spacing between the first and second magnetizable materials, the third and fourth magnetizable materials being attached to a second object in a line with a second spacing between the third and fourth magnetizable materials, the first spacing being substantially the same as the second spacing.

The first polarity pattern of the first magnetizable material can be in reversed order than the first polarity pattern of the second magnetizable material and the second polarity pattern of the third magnetizable material can be in reversed order than the second polarity pattern of the fourth magnetizable material.

In an additional aspect, the present invention provides a magnetic system comprising a first magnetizable material comprising a first portion and a second portion, the first portion having a first polarity pattern having only two polarity regions, the second portion having a second polarity pattern having three or more regions, and a second magnetizable material comprising a third portion and a fourth portion, the third portion having a third polarity pattern that is complementary to the first polarity pattern, the fourth portion having fourth polarity pattern that is anti-complementary to the second polarity pattern, the first magnetizable material and the second magnetizable material being configurable such that the first polarity pattern is aligned with the third polarity pattern and the second polarity pattern is aligned with the fourth polarity pattern, the first magnetizable material and the second magnetizable material being configurable such that the first polarity pattern is misaligned with the third polarity pattern and the second polarity pattern is misaligned with the fourth polarity pattern, the first portion and the third portion producing attract magnetic forces in accordance with a first attract force curve when the first polarity pattern is aligned with the third polarity pattern, the second portion and the fourth portion producing repel magnetic forces in accordance with a repel force curve when the second polarity pattern is aligned with the fourth polarity pattern, the first attract force curve having a first extinction rate, the repel force curve having a second extinction rate, the second extinction rate being greater than the first extinction rate; wherein the repel force curve and the first attract curve produce a composite force curve that is a second attract force curve.

The composite force curve can include an inflection point.

The first magnetizable material can be moveable relative to the second magnetizable material in at least two dimensions.

The first magnetizable material is moveable relative to the second magnetizable material in at least two dimensions for a first part of the composite first curve and the first magnetizable material is moveable relative to the second magnetizable material in only one dimension for a second portion of the composite first curve.

The magnetic system may further comprise a third magnetizable material that is substantially the same as the first magnetizable material and a fourth magnetizable material that is substantially the same as the second magnetizable material, the first magnetizable material and the second magnetizable material being attached to a first object in a line with a first spacing between the first magnetizable material and the second magnetizable materials, the third magnetizable material and the fourth magnetizable material being attached to a second object in a line with a second spacing between the third and fourth magnetizable materials, the first spacing being substantially the same as the second spacing.

The first magnetizable material, the second magnetizable material, the third magnetizable material, and the fourth magnetizable material can be configured to be magnetically balanced across an interface boundary.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 3 depicts use of the Barker 7 code to define a magnetic structure.

FIG. 5 depicts relative alignments of a first magnetic field emission structure having polarities and magnetic source positions defined by a Barker 7 code and a second magnetic field emission structure that corresponds to three repeating code modulos of the Barker 7 code.

FIG. 10 depicts exemplary magnetic field structures designed to enable automatically closing drawers.

FIGS. 14A-14C depict exemplary approaches for subdividing a single piece of magnetizable material into two or more portions that can be magnetized to produce different force curves that combine to produce a composite force curve.

FIG. 14D depicts an exemplary magnetic system comprising multiple discrete magnets disclosed in U.S. Pat. No. 4,912,727.

FIGS. 16A-16C depict exemplary approaches for subdividing a rectangular piece of magnetizable material into two or more portions that can be magnetized to produce different force curves that combine to produce a composite force curve.

FIGS. 20A-20C depict three exemplary magnetic systems very similar to the magnetic systems of FIGS. 18A-18C, where the first portions of each of the three magnetic systems has a polarity pattern in accordance with a Barker 3 code.

FIG. 21 depicts an exemplary magnetic system much like that of FIG. 20C except the second portions have a two dimensional alternating polarity pattern.

FIG. 22 depicts an exemplary magnetic system much like that of FIG. 20C except the second portions have a sparse array of maxels of a first polarity that are printed on the side of a magnetizable material having a second polarity.

FIGS. 23A-23C depict exemplary magnetic systems each involving two circular pieces of magnetizable material of the same size and grade.

DETAILED DESCRIPTION OF THE INVENTION

Figure 1:
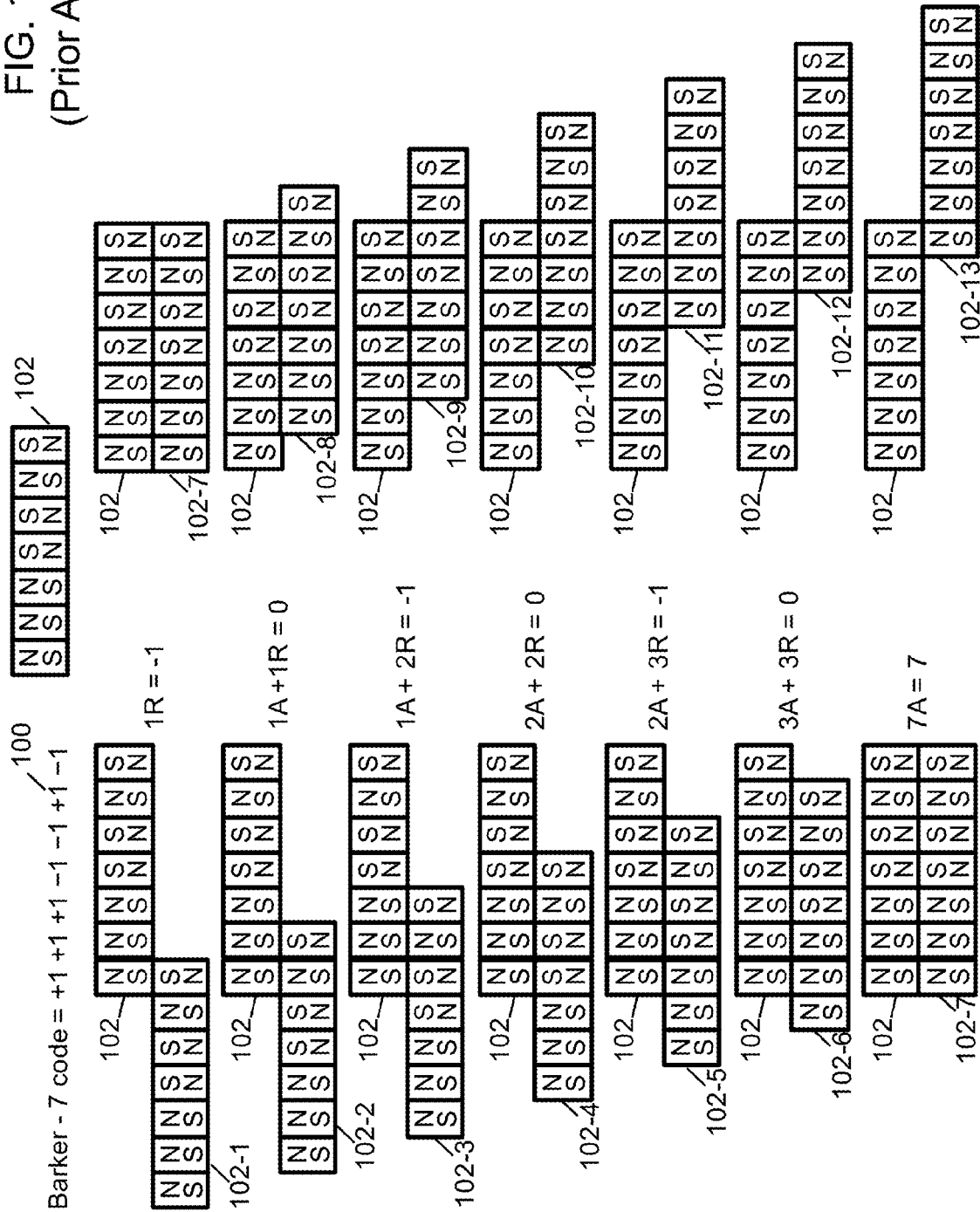
FIG. 1 depicts a Barker 7 code.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

Certain described embodiments may relate, by way of example but not limitation, to systems and/or apparatuses for producing magnetic structures, methods for producing magnetic structures, magnetic structures produced via magnetic printing, combinations thereof, and so forth. Example realizations for such embodiments may be facilitated, at least in part, by the use of an emerging, revolutionary technology that may be termed correlated magnetics. This revolutionary technology referred to herein as correlated magnetics was first fully described and enabled in the co-assigned U.S. Pat. No. 7,800,471 issued on Sep. 21, 2010, and entitled "A Field Emission System and Method". The contents of this document are hereby incorporated herein by reference. A second generation of a correlated magnetic technology is described and enabled in the co-assigned U.S. Pat. No. 7,868,721 issued on Jan. 11, 2011, and entitled "A Field Emission System and Method". The contents of this document are hereby incorporated herein by reference. A third generation of a correlated magnetic technology is described and enabled in the co-assigned U.S. Pat. No. 8,179,219 issued on May 15, 2012, and entitled "A Field Emission System and Method". The contents of this document are hereby incorporated herein by reference. Another technology known as correlated inductance, which is related to correlated magnetics, has been described and enabled in the co-assigned U.S. Pat. No. 8,115,581 issued on Feb. 14, 2012, and entitled "A System and Method for Producing an Electric Pulse". The contents of this document are hereby incorporated by reference.

Material presented herein may relate to and/or be implemented in conjunction with multilevel correlated magnetic systems and methods for producing a multilevel correlated magnetic system such as described in U.S. Pat. No. 7,982,568 issued Jul. 19, 2011 which is all incorporated herein by reference in its entirety. Material presented herein may relate to and/or be implemented in conjunction with energy generation systems and methods such as described in U.S. patent application Ser. No. 13/184,543 filed Jul. 17, 2011, which is all incorporated herein by reference in its entirety. Such systems and methods described in U.S. Pat. No. 7,681,256 issued Mar. 23, 2010, U.S. Pat. No. 7,750,781 issued Jul. 6, 2010, U.S. Pat. No. 7,755,462 issued Jul. 13, 2010, U.S. Pat. No. 7,812,698 issued Oct. 12, 2010, U.S. Pat. Nos. 7,817,002, 7,817,003, 7,817,004, 7,817,005, and 7,817,006 issued Oct. 19, 2010, U.S. Pat. No. 7,821,367 issued Oct. 26, 2010, U.S. Pat. Nos. 7,823,300 and 7,824,083 issued Nov. 2, 2011, U.S. Pat. No. 7,834,729 issued Nov. 16, 2011, U.S. Pat. No. 7,839,247 issued Nov. 23, 2010, U.S. Pat. Nos. 7,843,295, 7,843,296, and 7,843,297 issued Nov. 30, 2010, U.S. Pat. No. 7,893,803 issued Feb. 22, 2011, U.S. Pat. Nos. 7,956,711 and 7,956,712 issued Jun. 7, 2011, U.S. Pat. Nos. 7,958,575, 7,961,068 and 7,961,069 issued Jun. 14, 2011, U.S. Pat. No. 7,963,818 issued Jun. 21, 2011, and U.S. Pat. Nos. 8,015,752 and 8,016,330 issued Sep. 13, 2011 are all incorporated by reference herein in their entirety.

The number of dimensions to which coding can be applied to design correlated magnetic structures is very high giving the correlated magnetic structure designer many degrees of freedom. For example, the designer can use coding to vary magnetic source size, shape, polarity, field strength, and location relative to other sources in one, two, or three-dimensional space, and, if using electromagnets or electro-permanent magnets can even change many of the source characteristics in time using a control system. Various techniques can also be applied to achieve multi-level magnetism control. In other words, the interaction between two structures may vary depending on their separation distance. The possible combinations are essentially unlimited.

In accordance with the present invention, first portions of two magnetic structures have a complementary arrangement such that they produce at least one attract force and second portions of the two magnetic structures have an anti-complementary arrangement such that produce at least one repel force. The two magnetic structures produce a force function when one of the two structures is moved relative to the other that can be tailored based upon the subdivision of the amount of a total area available into the first and second portions, the characteristics of the one or more magnetic sources making up each of the first and second portions including the relative location, size, polarity, and field strength of the magnetic sources. A force function may correspond to at least one of an autocorrelation function or a force versus distance function, where the relative movement of the two structures may be may be to translate, rotate, and/or to separate one structure relative to the other structure.

U.S. Pat. No. 7,800,471, filed May 20, 2008 and issued Sep. 21, 2010, discloses complementary coded magnetic structures that produce a peak attract force when the codes of the two structures are aligned and discloses anti-complementary coded magnetic structures that produce a peak repel force when the codes of the two structures are aligned, where both the complementary and anti-complementary magnetic structures produce a combination of repel and attract forces that will to some extent cancel each other when the codes of the two structures are misaligned. The disclosures pertaining to FIGS. 1 through 6 below are disclosed in U.S. Pat. No. 7,800,471.

FIG. 1 depicts a Barker (length) 7 code 100 having seven code elements +1 +1 +1 −1 −1 +1 −1. The Barker 7 code 100 is mapped to a magnetic structure 102 having seven equally sized portions corresponding to seven equally sized magnetic sources, where the polarity direction of a given magnetic source is determined by the value (i.e., +1 or −1) of a given code element of the Barker 7 code 100. In this embodiment, the field strengths of the magnetic sources are assumed to be the same, which is provided a unit of 1 (where A=Attract, R=Repel, A=−R, A=1, R=−1). Also shown in FIG. 1 is a first magnetic structure 102 that remains stationary as a second magnetic structure that is complementary to the first magnetic structure 102 is shown in thirteen different relative alignments 102-1 through 102-13 corresponding to the code of the second structure moving across the code of the first magnetic structure, where the combined forces produced by opposing magnetic sources are calculated.

Figure 2:
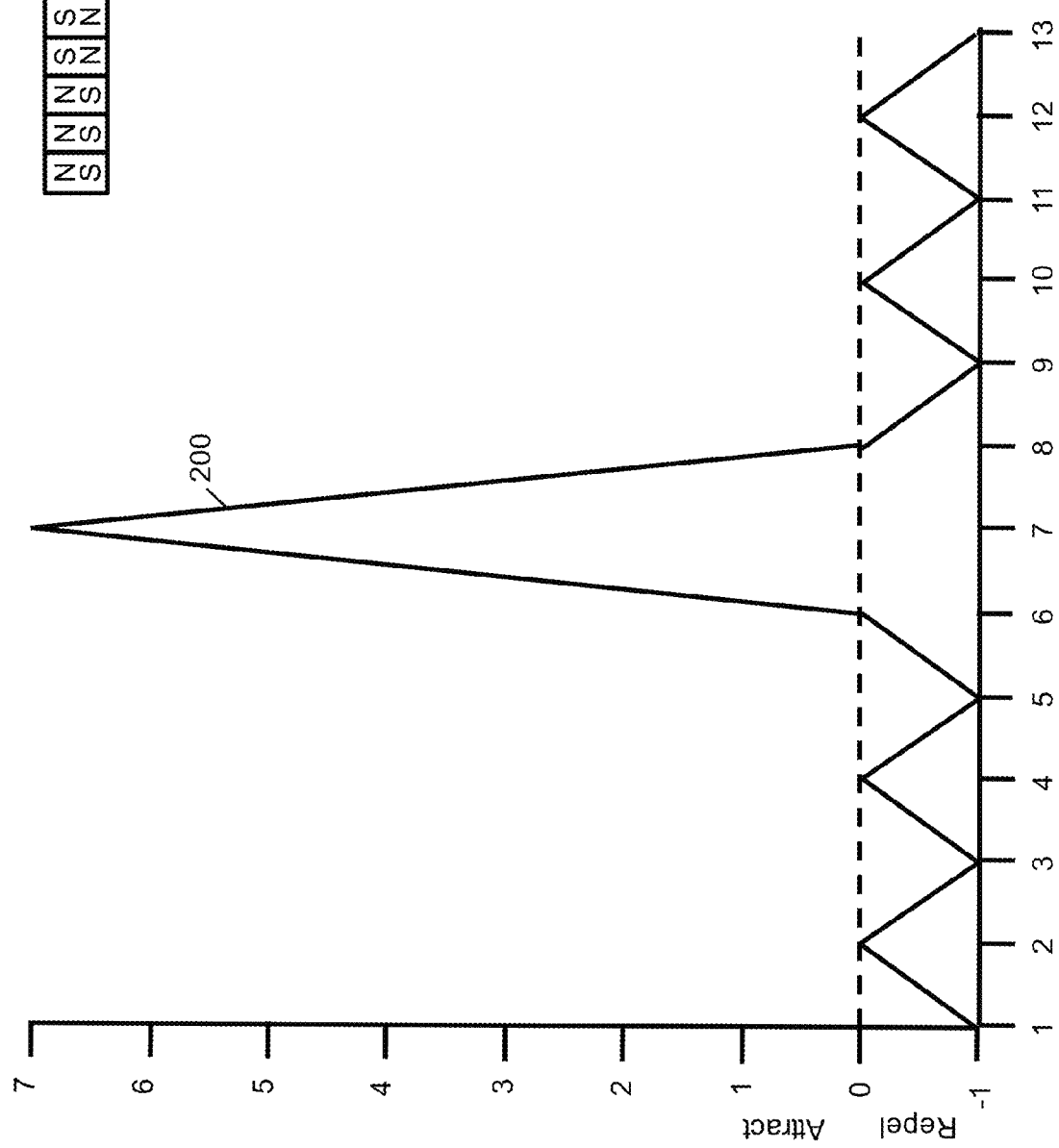
FIG. 2 depicts the autocorrelation function of the Barker 7 code.

FIG. 2 depicts the autocorrelation function of the Barker 7 code, where the values at each alignment position 1 through 13 correspond to the spatial force values calculated for the thirteen alignment positions shown in FIG. 1. The peak force (7) is shown to occur at alignment position 7, which corresponds to when the two codes are aligned (or correlated), and the off-peak forces, which correspond to the misalignment positions, are shown to be zero or a small repel force (−1). Because the peak force is much stronger than the nearby off peak forces, the two magnetic structures have an auto alignment characteristic, where as one of the magnetic structures is moved across the other magnetic structure, the magnetic forces between the two structures cause them to fully align with each other such that they are correlated.

FIG. 3 depicts use of the Barker 7 code to define a magnetic structure 302 where each of the magnetic sources has the same strength (A=−R, A=−1, R=1), with the exception of two magnetic sources indicated with bolded N and S that have twice the magnetic strength as the other magnetic sources. As such, a bolded magnet interfacing with a non-bolded magnetic source represent 1.5 times the strength as two non-bolded magnetic sources and two bolded magnetic sources represent twice the strength of two non-bolded magnetic sources. When a first magnetic structure 302 is moved past a second magnetic structure in thirteen different relative alignments 302-1 through 302-13, such as were depicted in FIG. 1, the combined forces for each alignment produce an autocorrelation function shown in FIG. 4, where the difference between the autocorrelation functions of FIGS. 2 and 4 corresponds to the amplitude modulation of the two magnetic sources in the magnetic structure 302 of FIG. 3. As such, FIGS. 3 and 4 depict how amplitude modulation (i.e., varying the field strength) of one or more magnetic sources making up a magnetic structure can be used to tailor an autocorrelation function.

Figure 4A:
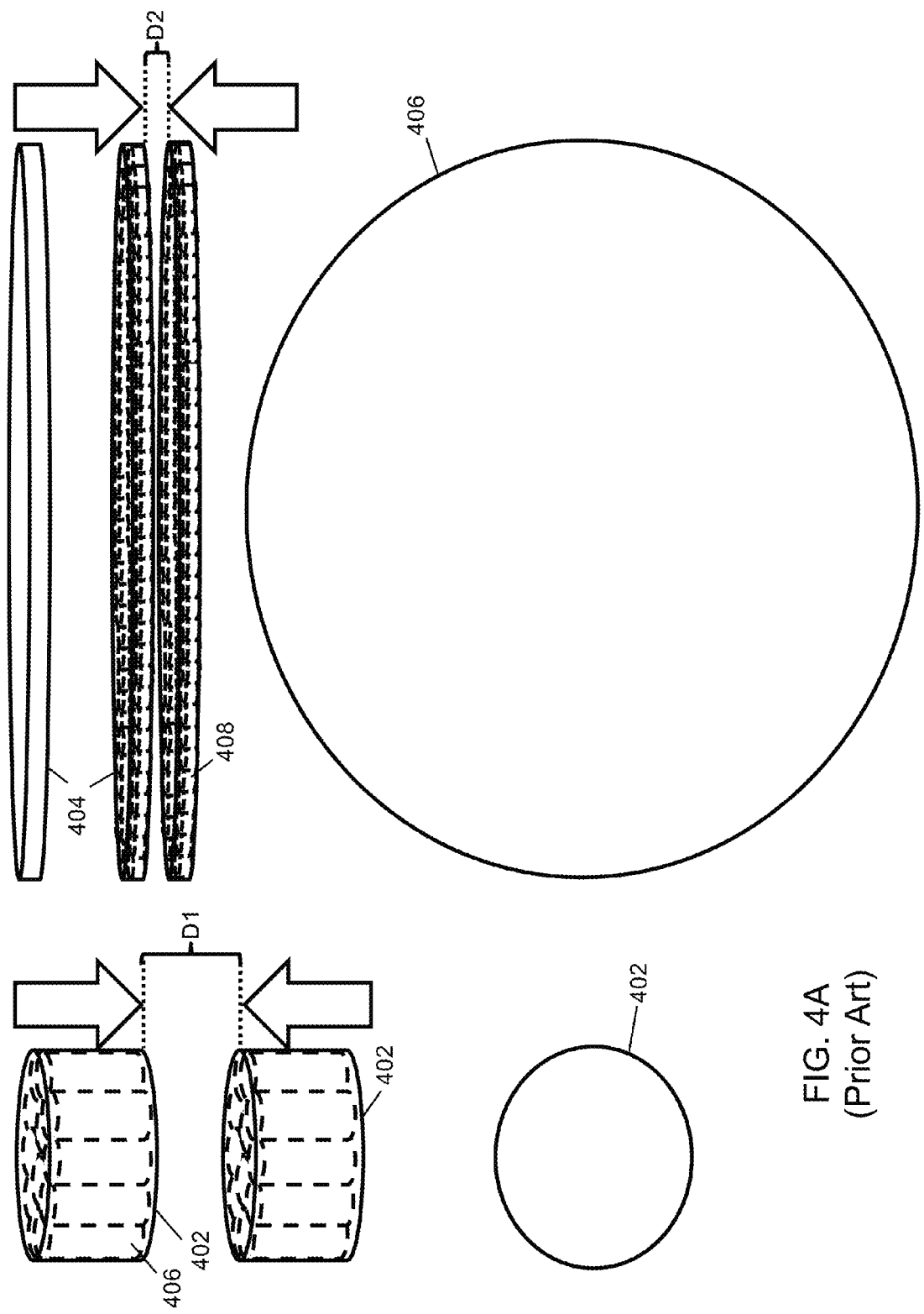
FIG. 4A depicts an oblique projection of a first pair of magnetic field emission structures and a second pair of magnetic field emission structures.

FIG. 4A depicts an oblique projection of a first pair of magnetic field emission structures 402 and a second pair of magnetic field emission structures 404 each having magnets indicated by dashed lines. Above the second pair of magnetic field emission structures 404 (shown with magnets) is another magnetic field emission structure where the magnets are not shown, which is intended to provide clarity to the interpretation of the depiction of the two magnetic field emission structures 404 below. Also shown are top views of the circumferences of the first and second pair of magnetic field emission structures 402 and 404. As shown, the first pair of magnetic field emission structures 402 have a relatively small number of relatively large (and stronger) magnets 406 when compared to the second pair of magnetic field emission structures 404 that have a relatively large number of relatively small (and weaker) magnets 408. For this figure, the peak spatial force for each of the two pairs of magnetic field emission structures 402 and 404 are the same. However, the distances D1 and D2 at which the magnetic fields of each of the pairs of magnetic field emission structures 402 and 404 substantially interact (shown by up and down arrows) depends on the strength of the magnets 406 and 408 and the area over which they are distributed. As such, the much larger surface of the second magnetic field emission structure 404 having much smaller magnets 408 will not substantially attract until much closer than that of first magnetic field emission structure 402 having much larger magnets 406. This magnetic strength per unit area attribute as well as a magnetic spatial frequency (i.e., # magnetic reversals per unit area) can be used to design structures to meet safety requirements. For example, two magnetic field emission structures 404 can be designed to not have significant attraction force if a finger is between them (or in other words the structures wouldn't have significant attraction force until they are substantially close together thereby reducing (if not preventing) the opportunity/likelihood for body parts or other things such as clothing getting caught in between the structures).

Figure 4B:
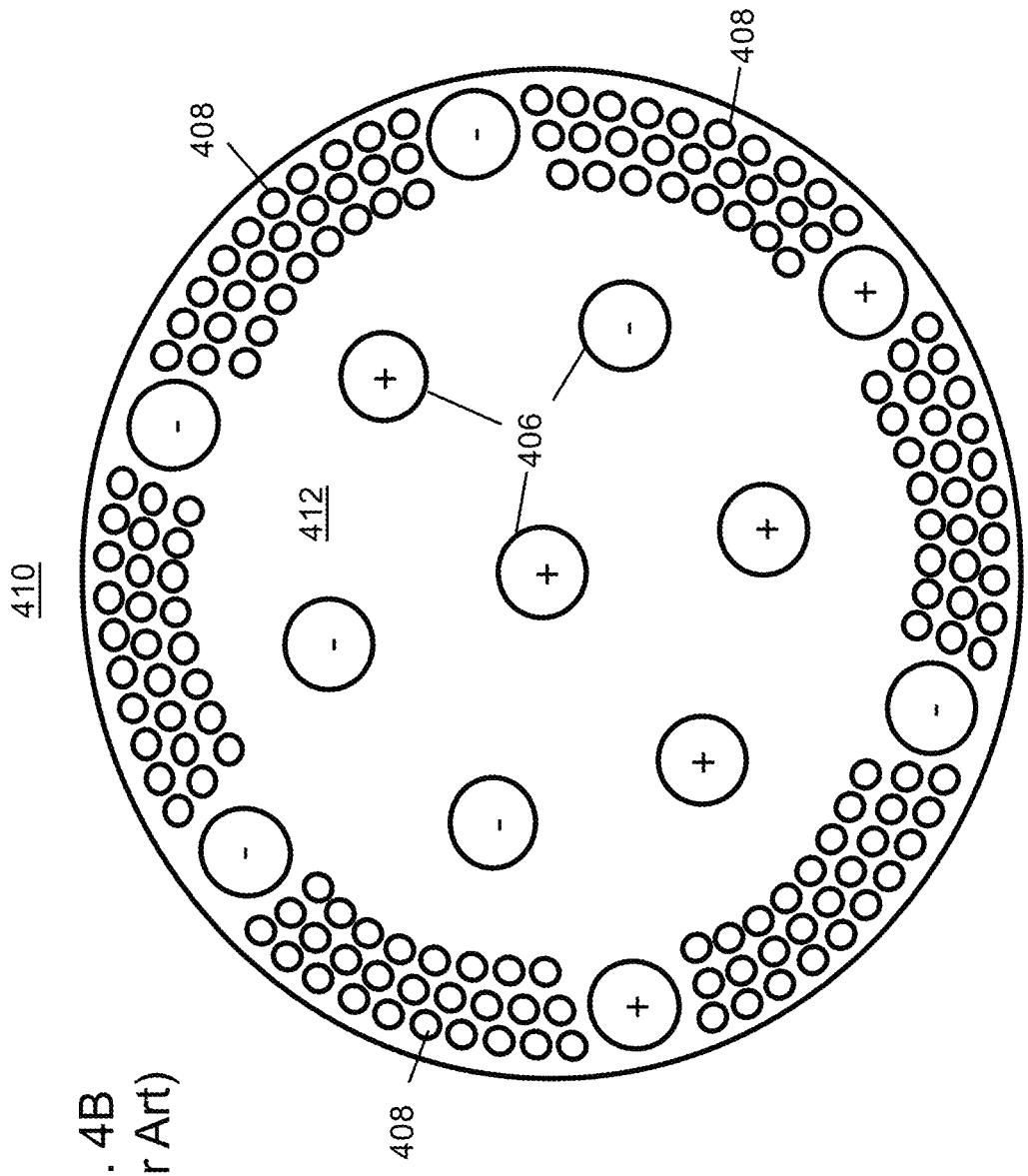
FIG. 4B depicts an exemplary magnetic field emission structure made up of a sparse array of large magnets combined with a large number of smaller magnets configured in a non-magnetic material.

FIG. 4B depicts an exemplary magnetic field emission structure 410 made up of a sparse array of large magnets (or magnetic sources) 406 combined with a large number of smaller magnets (or magnetic sources) 408 configured in a non-magnetic material 412 (e.g., plastic or aluminum), whereby alignment with a mirror image magnetic field emission structure would be provided by the large sources and a repel force would be provided by the smaller sources. Generally, the larger (i.e., stronger) magnets achieve a significant attraction force (or repelling force) at a greater separation distance than smaller magnets. Because of this characteristic, combinational structures having two or more portions having magnetic sources of different strengths can be constructed that effectively have two (or more) spatial force functions corresponding to the different levels of magnetic strengths employed. As the magnetic field emission structures 410 are brought closer together, the spatial force function of the strongest magnets is first to engage at a first distance, and the spatial force functions of the weaker magnets will engage when the magnetic field emission structures 410 are moved close enough together at a lessor second distance, at which the spatial force functions of the different sized magnets begin to noticeably combine.

Referring back to FIG. 4B, multiple first portions of the field emission structure corresponding to the sparse array of stronger magnetic sources 406 is coded such that it will seek to correlate (e.g., in this case, align) with a mirror image sparse array of magnetic sources 406. However, the number and polarity of the smaller (i.e., weaker) magnets 408 of the multiple second portions of the magnetic field emission structures can be tailored such that when the two magnetic field emission structures are aligned and substantially close together, the magnetic force of the smaller magnetic sources 408 can overtake that of the larger magnetic sources 406 such that an equilibrium will be achieved at some distance between the two magnetic field emission structures, where attract forces equal repel forces. As such, the stronger magnetic sources 406 can provide the two magnetic field emission structures an alignment behavior while contact of the two magnetic field emission structures can be prevented by the weaker magnetic sources 408. Similarly, the smaller, weaker magnetic sources 408 can be used to noticeably vary the forces produced by the larger magnetic sources 406, for example adding to the attraction forces between the two magnetic field emission structures.

Generally, one skilled in the art will understand that smaller magnetic sources 408 in opposing first portions of magnetic structures, which can be complementary or anti-complementary, can be used to noticeably vary (i.e., add to or subtract from) the attraction forces produced by the larger magnetic sources 406 in opposing second portions of the magnetic structures when two magnetic structures are close enough together, where such smaller magnetic sources 408 will have little effect on the attraction forces produced by the larger magnetic sources 406 when the two magnetic structures are farther apart.

Figure 5:
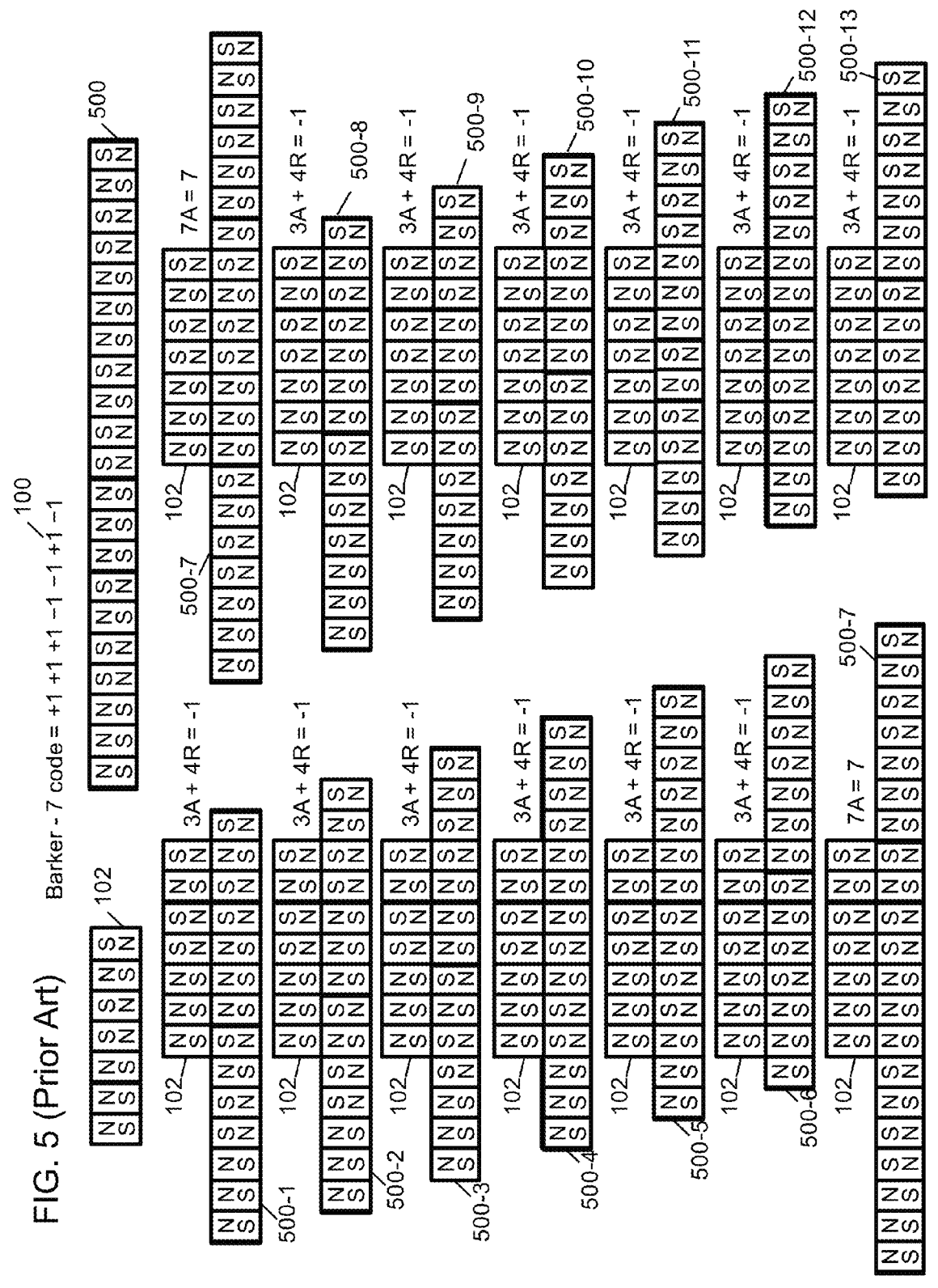

FIG. 5 depicts relative alignments of a first magnetic field emission structure 102 having polarities and magnetic source positions defined by a Barker length 7 code 100 and a second magnetic field emission structure 500 that corresponds to three repeating code modulos of the code 100 used to define the first magnetic field emission structure 102, where a code modulo is an instance of a code. Because the code of the second magnetic field structure 500 repeats, it can be referred to as a cyclic structure. Each magnetic source has the same or substantially the same magnetic field strength (or amplitude), which for the sake of this example will be provided a unit of 1 (A=−R, A=1, R=−1). Shown in FIG. 5 are thirteen different alignments 500-1 through 500-13 of the first magnetic field emission structure 102 and the second magnetic field emission structure 500, where all the magnetic sources of the first magnetic structure 502 are always interfacing with seven magnetic sources of the second magnetic field emission structure 500. For each relative alignment, the number of magnetic source pairs that repel plus the number of magnetic source pairs that attract is calculated, where each alignment has a spatial force in accordance with a spatial force function based upon the correlation function and the magnetic field strengths of the magnetic sources. With the specific Barker code used, the spatial force varies from −1 to 7, where the peak occurs when the two magnetic field emission structures are aligned such that their respective codes are aligned. The off peak spatial force, referred to as side lobe force, is −1. As such, the spatial force function causes the structures to generally repel each other unless they are substantially aligned when they will attract as if the magnetic sources in the structures were not coded.

Figure 6:
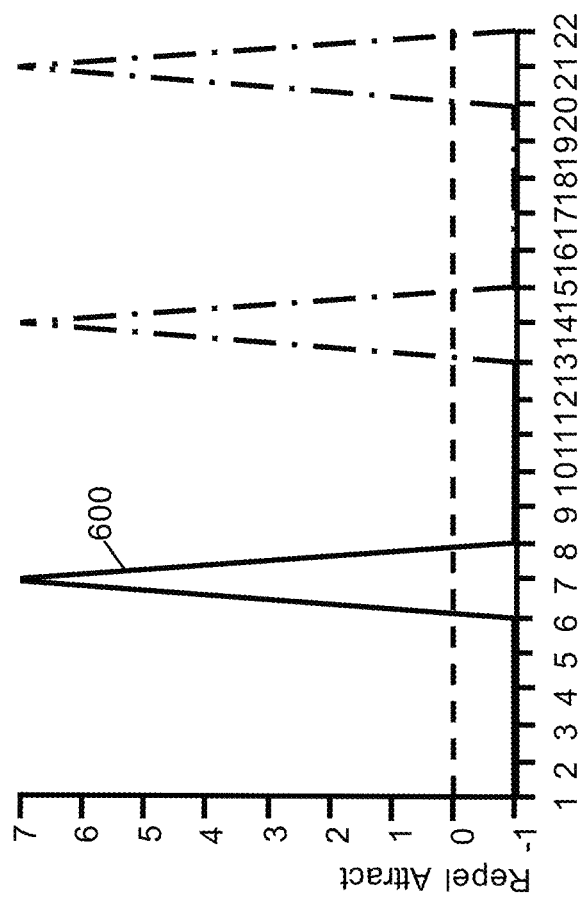
FIG. 6 depicts an exemplary spatial force function of the two magnetic field emission structures of FIG. 5.

FIG. 6 depicts an exemplary spatial force function 600 of the two magnetic field emission structures of FIG. 5, where the code that defines the second magnetic field emission structure 500 repeats. As such, as the code modulo repeats there is a peak spatial force that repeats every seven alignment shifts. The dash-dot lines of FIG. 6 depict additional peak spatial forces that occur when the first magnetic field structure 102 is moved relative to additional code modulos, for example, two additional code modulos. Note that the total force shows a peak of 7 each time the sliding magnetic field emission structure 102 aligns with the underlying Barker 7 pattern in a similar manner as previously described for FIG. 2 except the misaligned positions (positions 1-6 for example) show a constant −1 indicating a repelling force of one magnetic source pair. In contrast, the off-peak force in FIG. 2 alternates between 0 and −1 in the misaligned region, where the alternating values are the result of their being relative positions of non-cyclic structures where magnetic sources do not have a corresponding magnetic source with which to pair up. In magnet field emission structures, cyclic codes may be placed in repeating patterns to form longer patterns or may cycle back to the beginning of the code as in a circle or racetrack pattern. As such, cyclic codes are useful on cylindrically or spherically shaped objects.

U.S. Pat. No. 7,868,721, filed Jan. 23, 2010 and issued Jan. 11, 2011, is a continuation-in-part application of U.S. Pat. No. 7,800,471. It discloses ring magnet structures, use of a bias magnet or magnetic source, and a composite ring magnet structure. The disclosures pertaining to FIGS. 7A through 10 below are disclosed in U.S. Pat. No. 7,868,721.

Figure 7B:
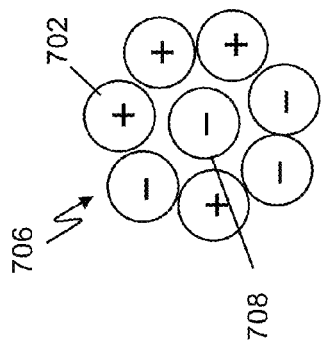
FIGS. 7A-7C illustrate exemplary ring magnet structures based on linear codes.
Figure 7C:
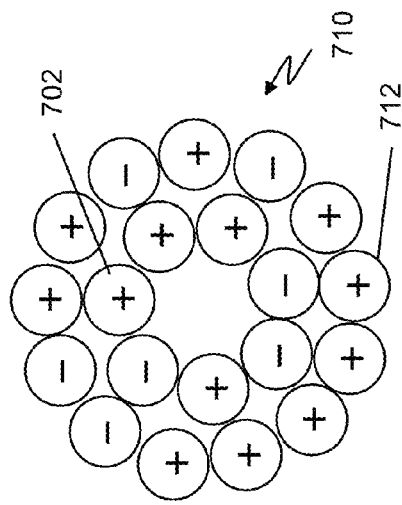
Figure 7A:
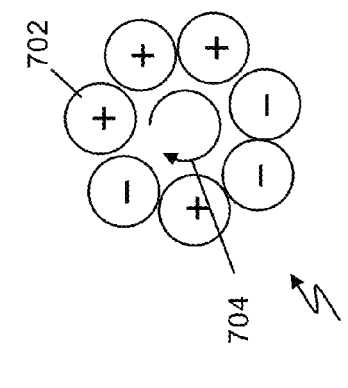

FIGS. 7A-7C illustrate exemplary ring magnet structures based on linear codes. Referring to FIG. 7A, a ring magnet structure 700 comprises seven magnets arranged in a circular ring with the magnet axes perpendicular to the plane of the ring and the interface surface is parallel to the plane of the ring. The exemplary magnet polarity pattern or code shown in FIG. 7A is the Barker 7 code. One may observe the "+, +, +, −, −, +, −" pattern beginning with magnet 702 and moving clockwise as indicated by arrow 704. A further interesting feature of this configuration is that the pattern may be considered to then wrap on it and effectively repeat indefinitely as one continues around the circle multiple times. Thus, one could use cyclic linear codes arranged in a circle to achieve cyclic code performance for rotational motion around the ring axis. The Barker 7 base pattern shown would be paired with a complementary ring magnet structure placed on top of the magnet structure face shown. As the complementary ring magnet structure is rotated, the force pattern can be seen to be equivalent to that of FIG. 6 because the complementary magnet structure is always overlapping a head to tail Barker 7 cyclic code pattern.

FIG. 7B shows a magnet structure 706 based on the ring code of FIG. 38a with an additional magnet 708 in the center. Magnet structure 706 has an even number of magnets. At least two features of interest are modified by the addition of the magnet 708 in the center. For rotation about the ring axis, one may note that the center magnet pair (in the base and in the complementary structure) remains aligned for all rotations. Thus, the center magnet pair adds a constant attraction or repelling force. Such magnets are referred to herein as biasing magnet sources. If the bias magnetic sources produced a constant attract force of +1 then the graph of FIG. 6 would be shifted from a repelling force of −1 and attracting force of 7 to a repelling force of 0 and an attracting force of 8 such that the magnetic structures would yield a neutral force when not aligned. Note also that the central magnet pair may be any value, for example −3, yielding an equal magnitude repelling and attracting force of −4 and +4, respectively. Generally, the complementary magnetic structures can be described as having first portions comprising coded magnets and second portions comprising biasing magnets.

FIG. 7C illustrates two concentric rings, each based on a linear cyclic code, resulting in a composite ring magnet structure 710. The composite ring magnetic structure 710 of FIG. 7C comprises a Barker 7 inner ring that is the same as the ring structure of FIG. 7A and a Barker 13 outer ring. The Barker 7 code begins with magnet 702 and the Barker 13 code begins with magnet 712. Generally, the complementary magnetic structures can be described as having first portions comprising coded magnets and second portions comprising coded magnets, where the concepts of FIGS. 7B and 7C could be combined such that the complementary magnetic structures also had first portions comprising coded magnets, second portions comprising coded magnets, and third portions comprising biasing magnets.

Figure 8:
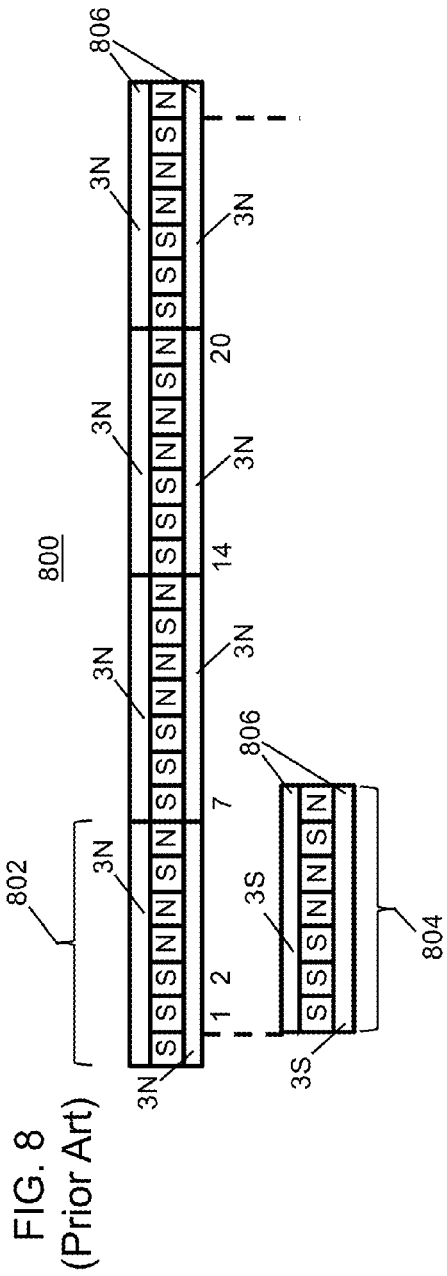
FIG. 8 depicts an exemplary use of biasing magnet sources to affect spatial forces of magnetic field structures.
Figure 9:
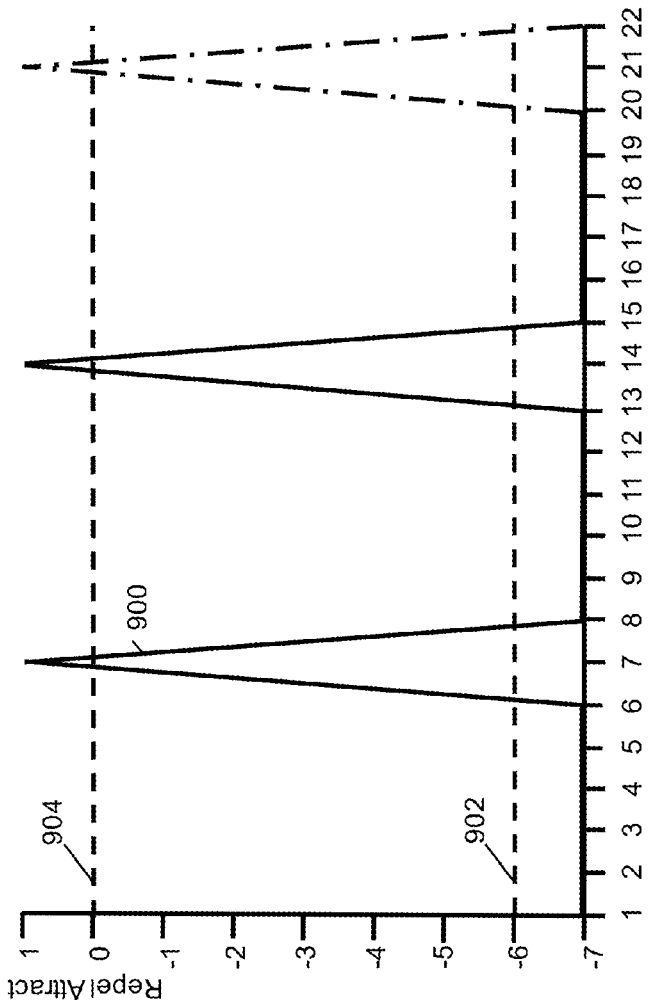
FIG. 9 depicts an exemplary spatial force function produced when the second magnetic field structure of FIG. 8 is moved across the top of the first magnetic field structure of FIG. 8.

FIG. 8 depicts an exemplary use of biasing magnet sources to affect spatial forces of magnetic field structures. Referring to FIG. 8, a top down view of two magnetic field structures is depicted. A first magnetic field structure 800 comprises magnetic field sources arranged in accordance with four repeating code modulos 802 of a Barker Length 7 code and also having on either side magnetic field sources having North polarity and a strength of 3. The individual sources have a strength of 1, as was the case in the example depicted in FIG. 5. A second magnetic field structure 804 is also coded in accordance with the Barker Length 7 code such that the bottom side of the second magnetic field structure has the mirror image coding of the top side of the first magnetic field structure. Both magnetic field structures have biasing magnets 806 configured to always provide a repel strength of 6 (or −6) whenever the second magnetic field structure 804 is placed on top of the first magnetic field structure 800. When the second magnetic field structure 804 is moved across the top of the first magnetic field structure 800 the spatial forces produced will be as depicted in FIG. 9. When FIG. 9 is compared to FIG. 6, one skilled in the art will recognize that the zero attraction line has moved from a first position 902 to a second position 904 as a result of the biasing magnets 806 and that many different arrangements of biasing magnets can be used to vary spatial force functions by adding constant repelling or attracting forces alongside those forces that vary based on relative positioning of magnetic field structures.

Figure 10:
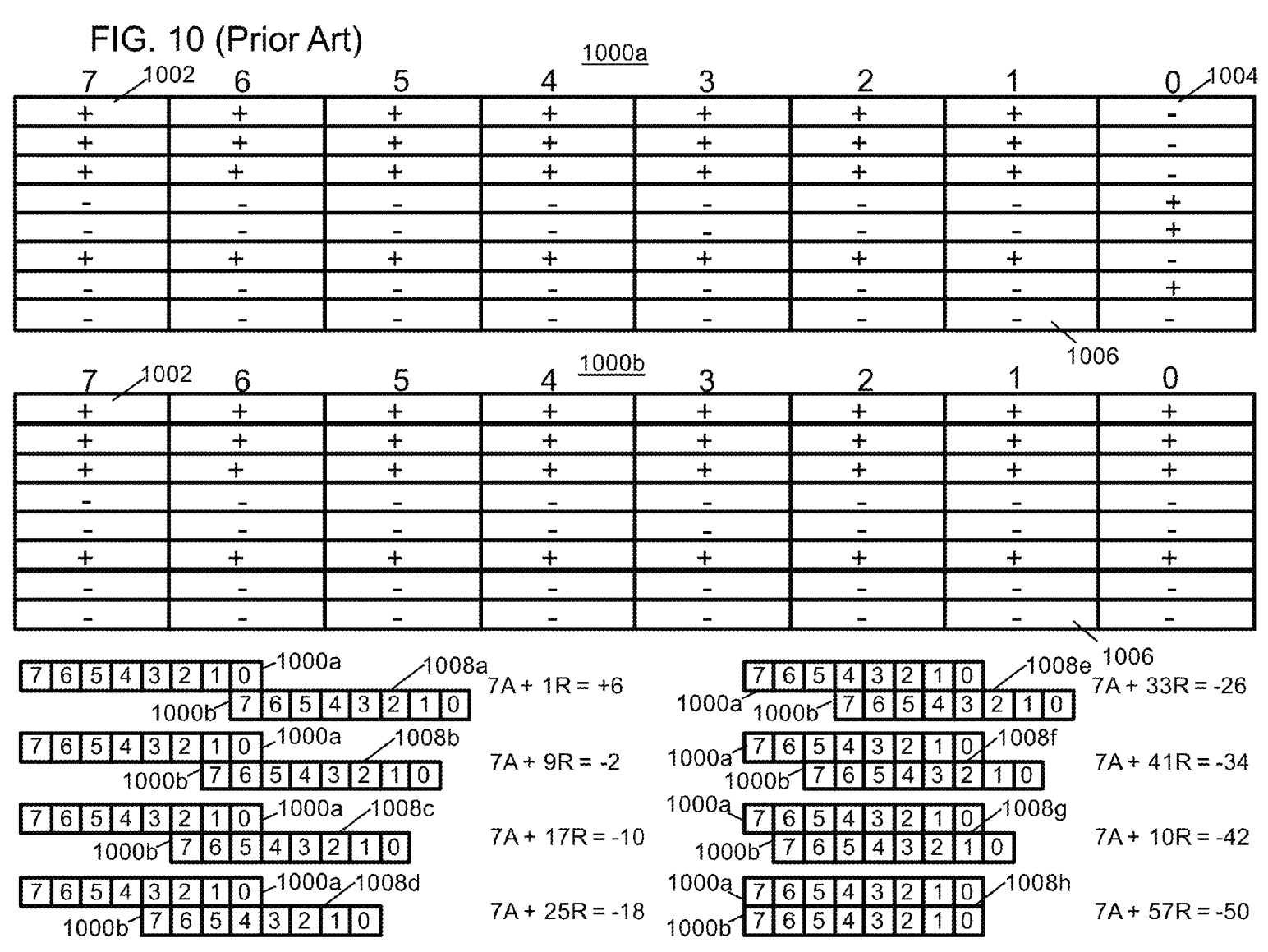

FIG. 10 depicts exemplary magnetic field structures designed to enable automatically closing drawers. The poles (+, −) depicted for the magnetic sources of the first magnetic field structure 1000a represent the values on the top of the structure as viewed from the top. The poles depicted for the magnetic sources of the second magnetic field structure 1000b represent the values on the bottom of the structure as viewed from the top. Each of the structures consists of eight columns numbered left to right 0 to 7. The first seven rows of the structures are coded in accordance with a Barker Length 7 code 1002 or the mirror image of the code 1004. The eighth row of each structure is a biasing magnet 1006. At the bottom of FIG. 49a, eight different alignments 1008a through 1000h of the two magnetic field structures 1000a 1000b are shown with the magnetic force calculated to the right of each depicted alignment. One skilled in the art will recognize that if the first structure 1000a was attached to a cabinet and the second structure 1000b was attached to a drawer, that a first alignment position 1008a having a +6 magnetic force might be the closed position for the drawer and each of the other seven positions 1008b through 1008h represent open positions having a successively increasing repelling force. With this arrangement, a person could open the drawer and release it at any open position and the drawer would automatically close. The two structures 1000a 1000b could be generally described as each having a first portion (i.e., first seven rows) comprising coded magnets and having a second portion (i.e., last row) having biasing magnets. It can also be noted that the amount of the biasing repel force produced between the magnetic structures 1000a 1000b increases with the number or interfacing biasing magnets as the first magnetic structure 1000a moves relative to the second magnetic structure 1000b.

U.S. Pat. No. 7,982,568, filed Sep. 18, 2010 and issued Jul. 19, 2011, discloses multi-level magnetic structures having inner and outer portions having different code densities, coding at least one portion, printing a sparse array of maxels having one polarity on the opposite polarity side of a conventional magnet, three concentric portions, composite force curves that transition from attract to repel, use of amplitude modulation to vary a composite force curve. The disclosures pertaining to FIGS. 11 through 15 below are disclosed in U.S. Pat. No. 7,868,721 with the exception of the disclosure pertaining to FIG. 14D, which was disclosed in U.S. Pat. No. 4,912,727, filed Feb. 10, 1989 and issued Mar. 27, 1990.

Figure 11:
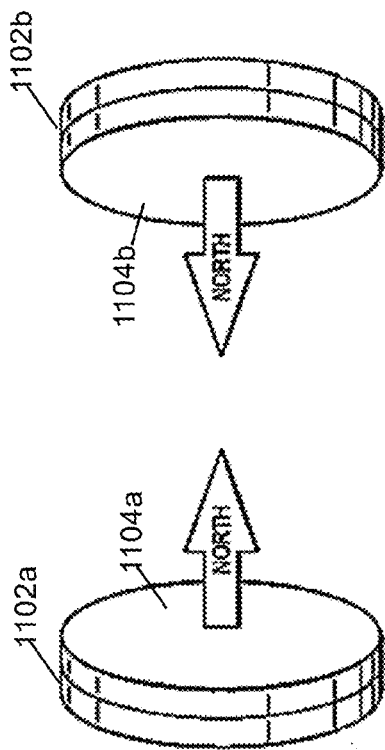
FIG. 11 depicts an exemplary first magnet and an exemplary second magnet in an anti-complementary relationship.

FIG. 11 depicts an exemplary first magnet 1102a and an exemplary second magnet 1102b in an anti-complementary relationship, where the North polarity sides 1104a 1104b of the two magnets face each other such that they produce a repel force.

Figure 12:
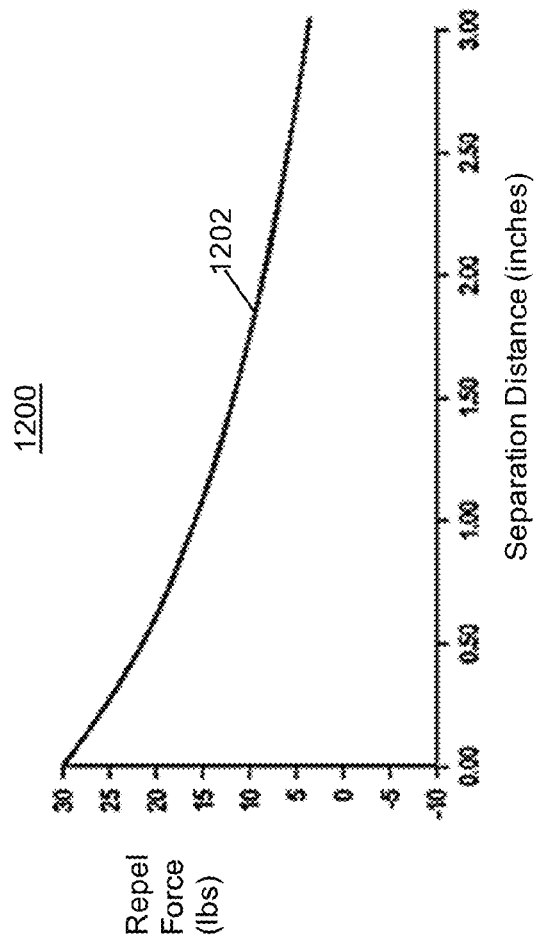
FIG. 12 depicts an exemplary force versus distance plot having an exemplary repel force curve.

FIG. 12 depicts an exemplary force versus distance plot 1200 having an exemplary repel force curve 1202, which is typically described as following an inverse square law where the force produced by two interfacing magnets decreases inversely proportional to the square of the distance between them. Magnets are also described as following an inverse cube law where the force produced by two interfacing magnet decrease inversely proportional to the cube of the distance between them.

The shape of a force curve of interfacing multi-pole magnets depends on the code density of the magnets, which corresponds to the number of polarity reversals per area of magnet material.

Figure 13:
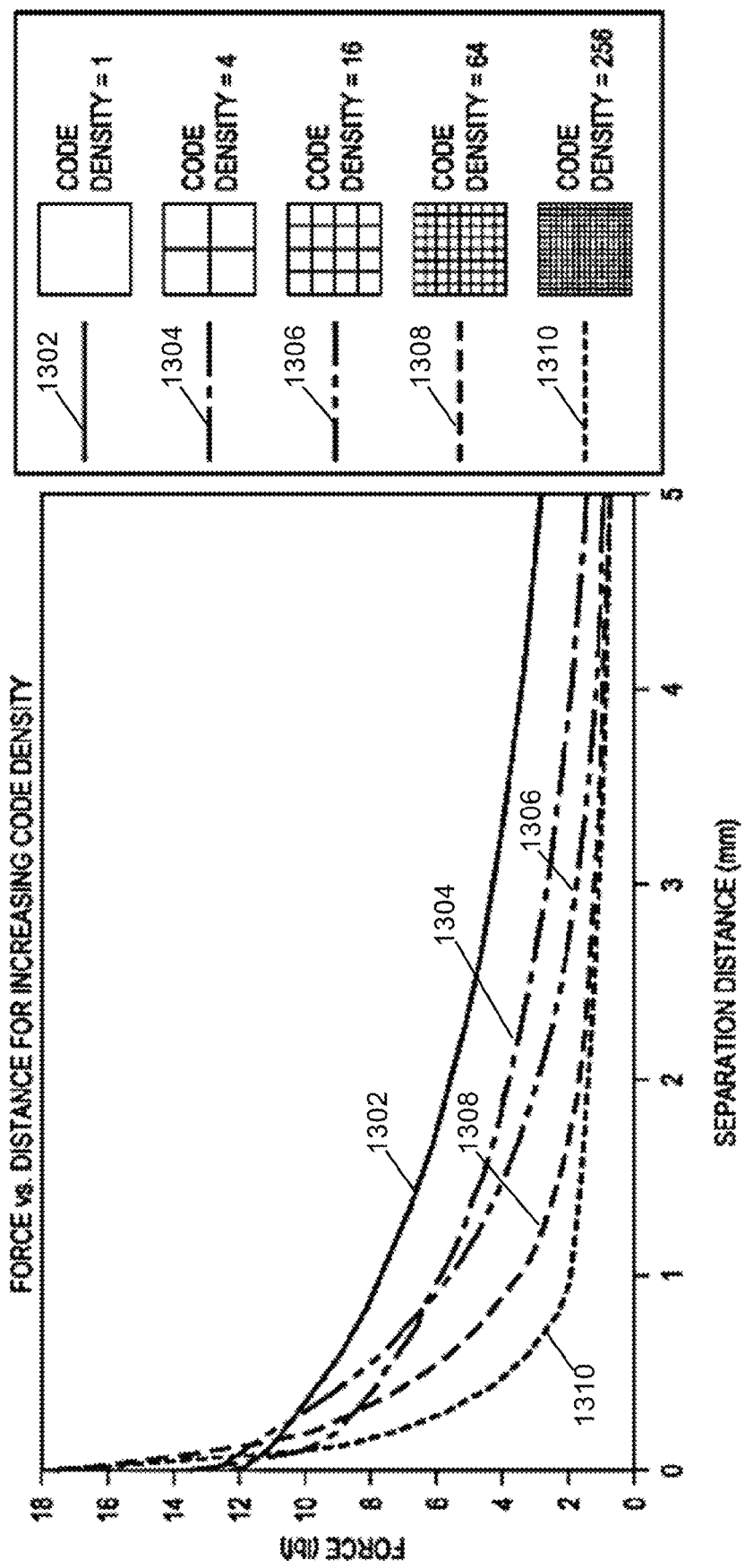
FIG. 13 depicts multiple force curves produced by varying the code density of the magnet sources of a complementary magnet pair using instances of a simple two-dimensional alternating polarity 'checkerboard' code.

FIG. 13 depicts multiple force curves 1302 through 1310 produced by varying the code density of the magnet sources of a complementary magnet pair using instances of a simple two-dimensional alternating polarity 'checkerboard' code. In this case, the material is NdFeB N42-grade ¾" square magnets at a thickness of ⅛" and code density is varied from 4 to 16 to 64 to 256 for comparison to the force curve of a conventional magnet (code density=1). While code density affects the severity of the slope of the force curve, as well as peak and far-field force levels, the magnetic source size, shape and amplitude affect the engagement distance of the forces of the magnet pair.

As previously described, opposing (i.e. both attract and repel) forces can be employed in interfacing magnetic structures simultaneously providing the magnet designer the ability to impart inflections into a force curve. The amplitude of a given printed magnetic source (or maxel) can be adjusted by varying the input power on the induction coil as the magnets are being 'printed/manufactured' which in turn affects the shape of a force curve. Attract and repel forces can be increased or decreased and the inflection point can be prescribed to meet specific application requirements.

FIGS. 14A-14C depict exemplary approaches for subdividing a single piece of magnetizable material into two or more portions that can be magnetized to produce different force curves that combine to produce a composite force curve. Referring to FIG. 14A, an exemplary magnetic system 1400 comprises two disc-shaped pieces of material 1402a and 1402b each subdivided into an outer portion 1404a and 1404b and an inner portion 1406a and 1406b. Similarly, FIG. 14B depict an exemplary magnetic system 1408 that comprises two square-shaped pieces of material 1410a and 1410b each subdivided into an outer portion 1412a and 1412b and an inner portion 1414a and 1414b. FIG. 14C depicts an exemplary magnetic system 1416, where two conventional magnets 1418a and 1418b have first sides 1420a and 1420b having a first polarity that have had sparse arrays of maxels 1422a and 1422b having a second polarity printed into them, which creates first portions about the maxels that have a higher code density than larger second portions of the magnets having the first polarity.

FIG. 14D depicts an exemplary magnetic system 1424 comprising multiple discrete magnets disclosed in U.S. Pat. No. 4,912,727. Referring to FIG. 14D, the magnetic system 1424 comprises a first pair of interfacing first portions 1426a and 1426b and a second pair of interfacing first portions 1426c and 1426d that each comprise four small magnets in an alternating polarity pattern configured to produce an attract force curve. The magnetic system 1424 also comprises opposing second portions 1428a and 1428b that each comprise a single large magnet, where the two large magnets are configured to produce a repel force curve. In between the first and second portions are regions of non-magnetic material 1430a-1430d.

Generally, after one or more pieces of magnetizable material have been subdivided into portions to be allocated to different force curves such as disclosed in FIGS. 14A-14C, the first portions can be magnetized to have a first code density and the second portions can be magnetized to have a second code density, where the first code density can be greater than or less than the second code density, and where the first portions and/or the second portions produce repel forces and/or the first portions and/or the second portions produce attract forces. Moreover, one or more first portions and/or one or more second portions may be separated such that they have non-magnetized material in between them, which could be for example a polycarbonate, plastic, aluminum, or the like.

Figure 15:
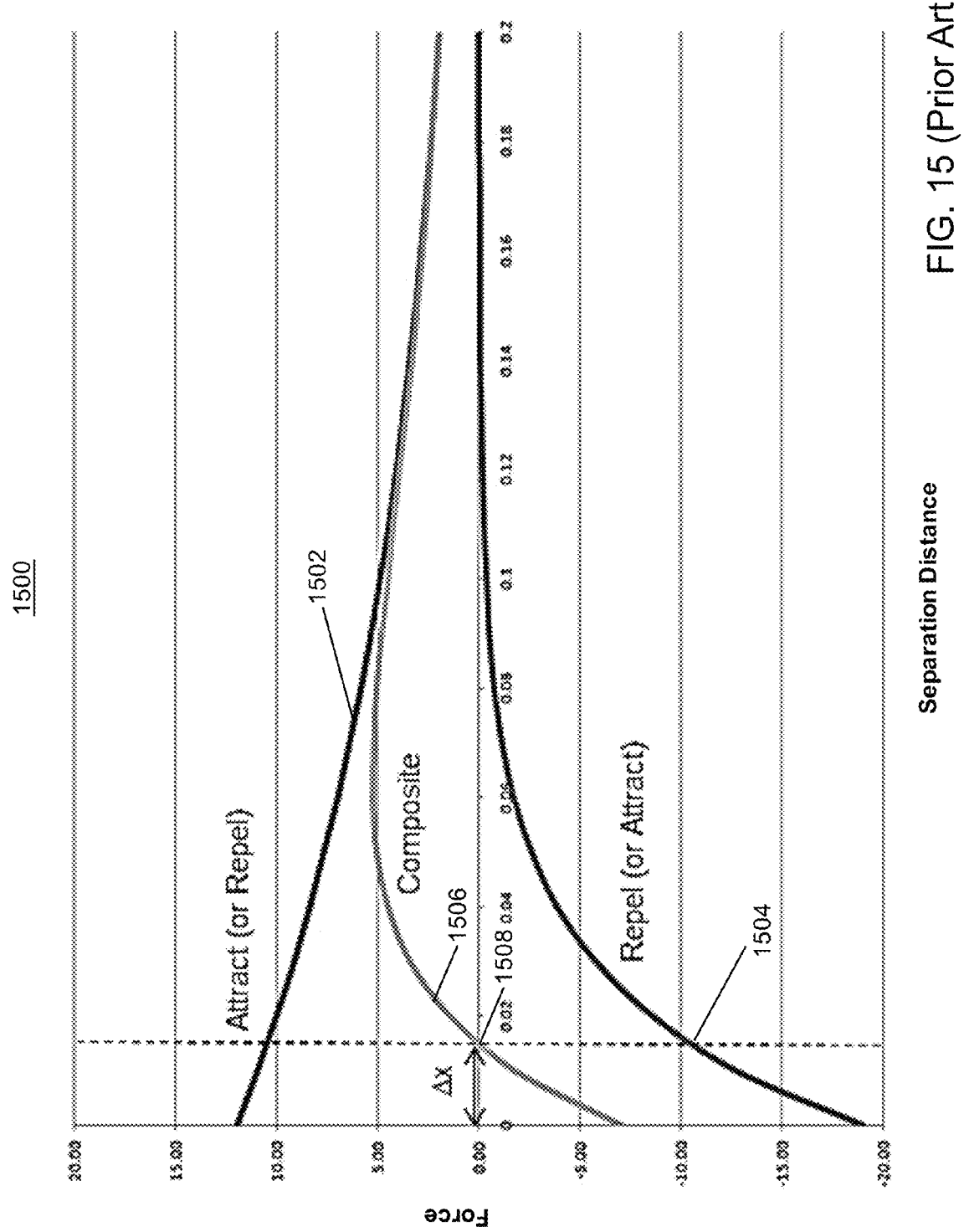
FIG. 15 depicts an exemplary composite force curve produced by combining an attract force curve and a repel force curve.

Under one arrangement depicted in FIG. 15, the first and second portions produce attract and repel force curves that combine to produce a composite force curve that can have a near field repel and a far field attract or a near field attract and a far field repel. Referring to FIG. 15, a force versus distance plot 1500 includes a first force curve 1502, which can be an attract force curve and a second force curve 1504, which can be a repel force curve, where the second force curve has the strongest force at zero distance but has a much faster extinction rate than the first force curve. The two force curves combine to produce a composite force curve 1506, which crosses over from an attract force to a repel force at a transition distance 1508. This arrangement has been described as producing a multi-level contactless attachment behavior since the magnetic structures are attracted to each other as they are brought together but then begin to repel each other, where they can be configured such that they remain magnetically attached yet separated. Alternatively, the first force curve 1502 can produce a repel force and the second force curve 1504 can produce an attract force. This arrangement has been described as producing a multi-level repel and snap behavior since the magnetic structures repel each other as they are brought together but then attract each other so that they will snap together (i.e., attach). With this arrangement, the terms near field and far field are typically meant to correspond to the magnetic field on each side of the transition distance, where near field is the field at distances less than the transition distance and the far field is the field at distances greater than the transition distance.

FIGS. 16A-16C depict exemplary approaches for subdividing rectangular piece of magnetizable material into two or more portions that can be magnetized to produce different force curves that combine to produce a composite force curve. Referring to FIG. 16A, a magnetic system 1600 comprises a first rectangular material 1602a and a second rectangular material 1602b that are each subdivided into first portions 1604a and 1604b and second portions 1606a and 1606b, where the first and second portions may or may not be equal in size. FIG. 16B depicts a magnetic system 1608 that comprises two pairs of the first and second rectangular material 1602a and 1602b of FIG. 16A where one of the magnet pairs is rotated 180 relative to the other pair. Typically such an arrangement would be used where the two pairs are constrained such that they are magnetically balanced across an interface boundary extending between the two pairs. FIG. 16C depicts a magnetic system comprising two magnets 1602a and 1602b that are subdivided into first portions 1604a 1604b and two pairs of second portions 1606a and 1606b, and 1606c and 1606d where the two magnets 1602a 1602b are configured to be magnetically balanced across an interface boundary extending between the two magnets.

Figure 17:
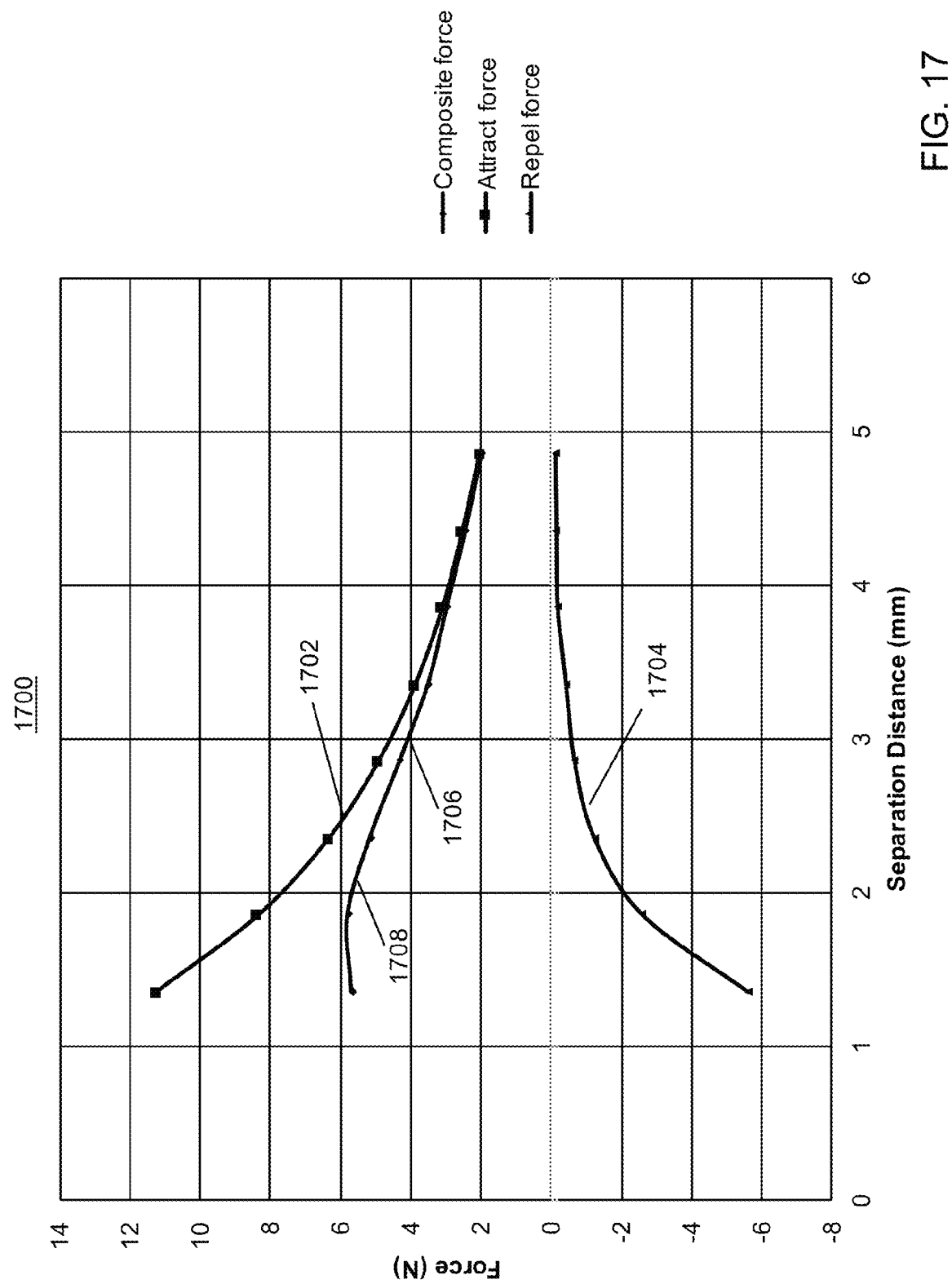
FIG. 17 depicts another arrangement where attract and repel force curves combine to produce a composite force curve that is also an attract force curve.

Under another arrangement depicted in FIG. 17, the first and second portions produce attract and repel force curves that combine to produce a composite force curve that is also an attract (only) force curve. In other words, when the repel force curve and attract force curve produced by the first and second portions combine, the repel force curve has the effect of reducing the attract forces in the near field without overtaking them such that composite (i.e., net) forces are all attract forces. Under yet another arrangement, the first and second portions can produce attract and repel force curves that combine to produce a composite force curve that is also a repel (only) force curve. For these two arrangements, the force curve tailoring process can be viewed as using the first portions of a magnet pair to produce attract (or repel) force curve characteristics that are desirable in the far field (e.g., providing some desired amount of force at some separation distance D) and then using the remaining second portions of the magnet pair to produce repel (or attract) forces that partially cancel the attract (or repel) forces primarily in the near field portion of the attract (or repel) force curve produced by the first portions in the near field. With these arrangements, the terms near field and far field are typically meant to correspond to the magnetic field on each side of an effective field cancellation distance beyond which the magnetic field produced by the second portions have only a very minor cancellation effect, the acceptable impact of which may be established by the underlying engineering requirements or tolerances, where the near field is the field at distances less than the effective field cancellation distance and the far field is the field at distances greater than the effective field cancellation distance.

Referring to FIG. 17, a force versus distance plot 1700 includes a first force curve 1702, which is an attract force curve and a second force curve 1704, which is a repel force curve, where the second force curve has a weaker force at zero distance and has a much faster extinction rate than the first force curve. The two force curves combine to produce a composite force curve 1706, which is also an attract force curve, where there may or may not be an inflection point 1708. Referring to FIG. 17, an effective field cancellation distance might be selected to be about 3.8 mm, where at distances beyond 3.8 mm the cancellation effect of the cancelling magnetic field is considered to be very minor.

Figure 18A:
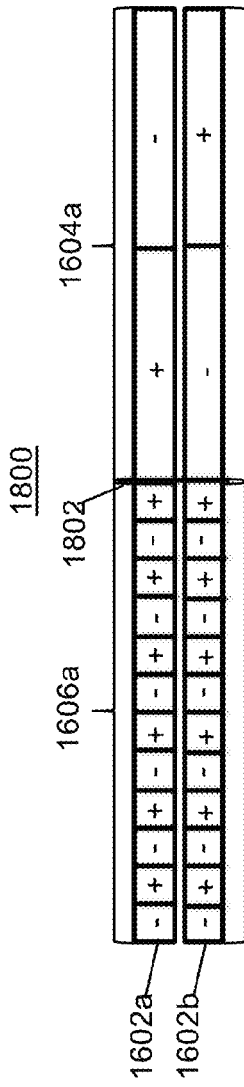
FIGS. 18A-18C depict three exemplary magnetic systems each involving two rectangular pieces of magnetizable material of the same size and grade.
Figure 18B:
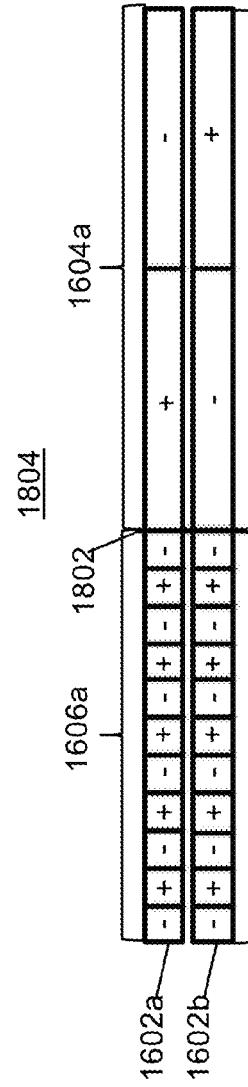
Figure 18C:
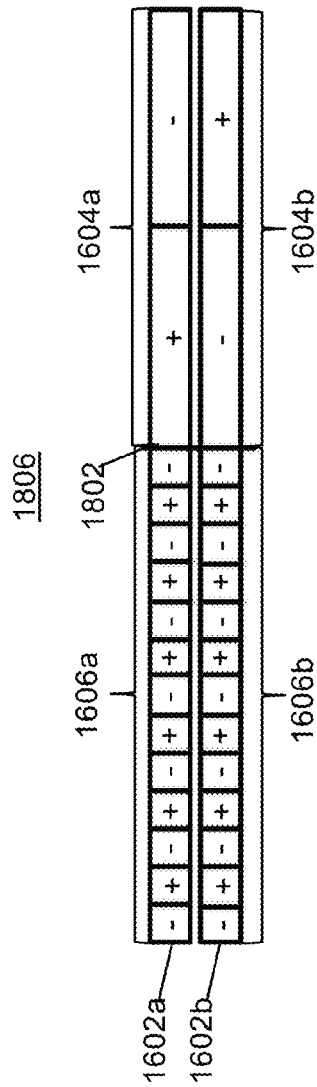

FIGS. 18A-18C depict three exemplary magnetic systems each involving two rectangular pieces of magnetizable material of the same size and grade. Referring to FIG. 18A, a first exemplary magnetic system 1800 comprises a first rectangular material 1602a and a second rectangular material 1602b that are each subdivided into first portions 1604a and 1604b and second portions 1606a and 1606b as indicated by a dividing line 1802. The first portions comprise two alternating polarity regions configured to produce attract forces and the second portions comprise twelve alternating polarity regions configured to produce repel forces, where the materials 1602a and 1602b are subdivided approximately in half. Note, that the polarities shown (i.e., + and −) are those on the interfacing sides of the respective pieces of material. Referring to FIG. 18B, a second exemplary magnetic system 1804 comprises a first rectangular material 1602a and a second rectangular material 1602b that are each subdivided into first portions 1604a and 1604b and second portions 1606a and 1606b as indicated by a dividing line 1802. The first portions comprise two alternating polarity regions configured to produce attract forces and the second portions comprise eleven alternating polarity regions configured to produce repel forces, where the materials are subdivided such that more than half of the materials produce attract forces. Referring to FIG. 18c, a third exemplary magnetic system 1806 comprises a first rectangular material 1602a and a second rectangular material 1602b that are each subdivided into first portions 1604a and 1604b and second portions 1606a and 1606b as indicated by a dividing line 1802. The first portions comprise two alternating polarity regions configured to produce attract forces and the second portions comprise thirteen alternating polarity regions configured to produce repel forces, where the materials are subdivided such that less than half of the materials produced attract forces.

Figure 19:
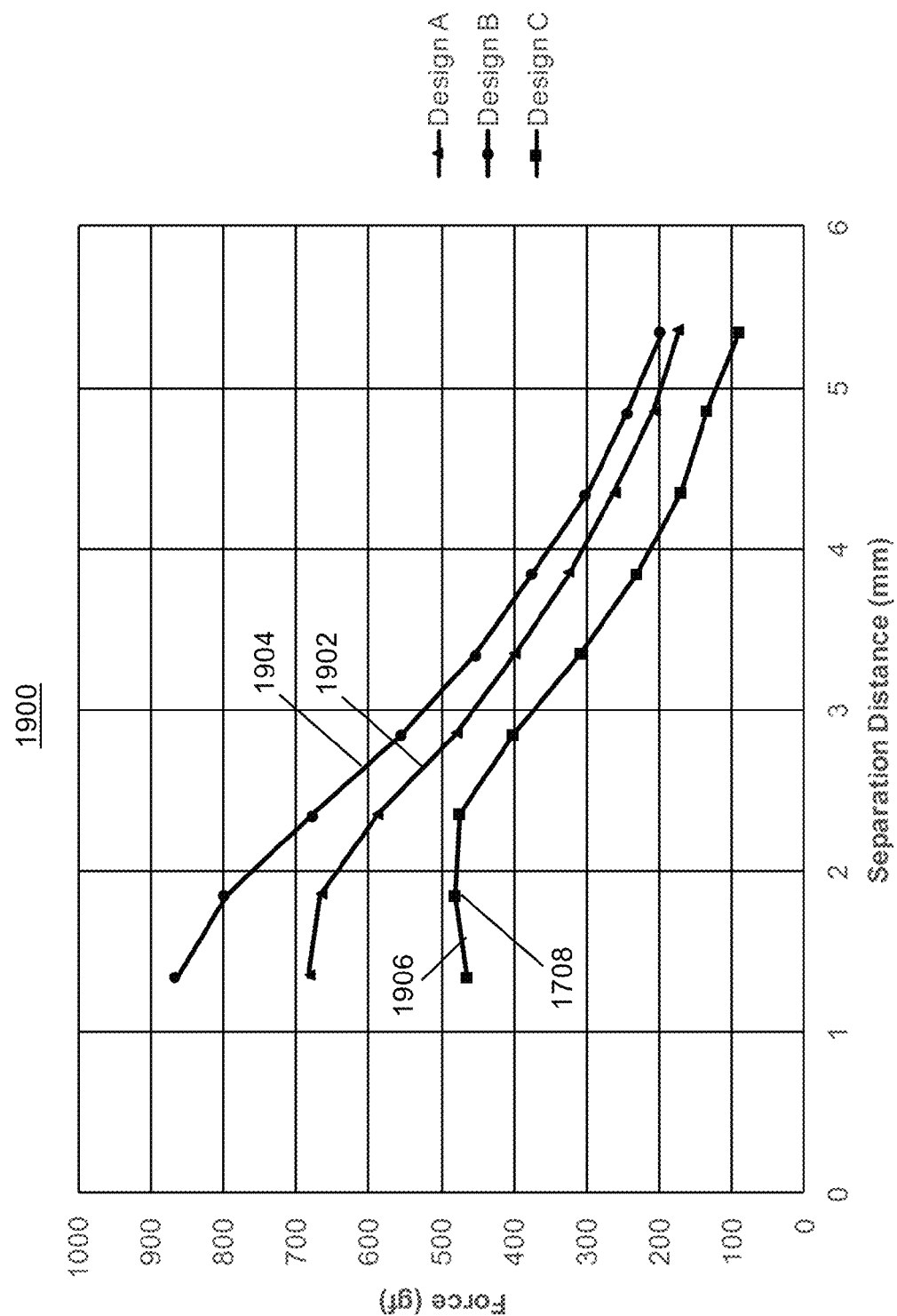
FIG. 19 depicts the three composite force curves corresponding to the three exemplary magnetic systems of FIGS. 18A-18C.

FIG. 19 depicts the three composite force curves corresponding to the three exemplary magnetic systems of FIGS. 18A-18C. Referring to FIG. 19, a first composite force curve 1902 corresponds to Design A depicted in FIG. 18A, a second composite force curve 1904 corresponds to Design B depicted in FIG. 18B, and a third composite force curve 1906 corresponds to Design C depicted in FIG. 18C. The third composite force curve 1906 has an inflection point 1708 and has about the same attract force between 1.35 mm to 2.35 mm of separation distance. As such, as the first rectangular material 1602a approaches the second rectangular material 1602b of the third magnetic system 1806, the fields of the smaller magnetic sources of the second portions 1606a and 1606b substantially cancel and the fields of the larger magnetic sources of the first portions 1604a and 1604b cause the two rectangular material 1602a and 1602b to align and then attach. When removing the first rectangular material 1602a from the second rectangular material 1602b, the required removing force is much less than those of the other two designs. Thus, Design C produces alignment and required strength in the far field as do the other two designs but maintains about the same strength in the near field thereby making detachment easier. The composite force curves of the three designs show the effect of allocating more of the material to far field effects (e.g., attract, repel, alignment behavior) versus near field effects (e.g., force cancellation), where Design A can be considered a reference where Design B allocates more material to far field effects and less to near field effects than does Design A and Design C allocates more material to near field effects and less to far field effects than does Design A.

FIGS. 20A-20C depict three exemplary magnetic systems very similar to the magnetic systems of FIGS. 18A-18C, where the first portions 1604a 1604b of each of the three magnetic systems has a polarity pattern in accordance with a Barker 3 code. Generally, one skilled in the art will understand that all sorts of codes can be used to cause alignment behaviors including any one of the family of Barker codes.

FIG. 21 depicts an exemplary magnetic system 2100 much like that of FIG. 20C except the second portions 1606a and 1606b have a two dimensional alternating polarity pattern.

FIG. 22 depicts an exemplary magnetic system 220 much like that of FIG. 20C except the second portions 1606a and 1606b have a sparse array of maxels of a first polarity that are printed on the side of material having a second polarity.

FIGS. 23A-23C depict exemplary magnetic systems 2300, 2308, and 2310 each involving two circular pieces of magnetizable material 2302a and 2302b of the same size and grade. Each of the two pieces of material 2302a and 2302b of each of the three magnetic systems is subdivided into first portions 2304a and 2304b by a dividing line 1802. Referring to FIG. 23A, the two circular pieces of material 2302a and 2302b have been subdivided into halves, where the first portions 2304a and 2304b comprise two alternating polarity regions configured to produce attract forces and the second portions 2306a and 2306b comprise eight alternating polarity regions configured to produce repel forces. Referring to FIG. 23B, the two circular pieces of material 2302a and 2302b have been subdivided such that first portions 2304a and 2304b are allocated approximately ⅔ of the materials 2302a and 2302b and the second portions 2306a and 2306b are allocated approximately ⅓ of the materials 2302a and 2302b, where the first portions 2304a 2304b comprise three polarity regions in accordance with a Barker 3 code that are configured to produce attract forces and the second portions 2306a and 2306b comprise six alternating polarity regions configured to produce repel forces. The magnetic system of FIG. 23C is the same as that of FIG. 23B except the first portions are not subdivided and instead just have opposite polarities.

Figure 24:
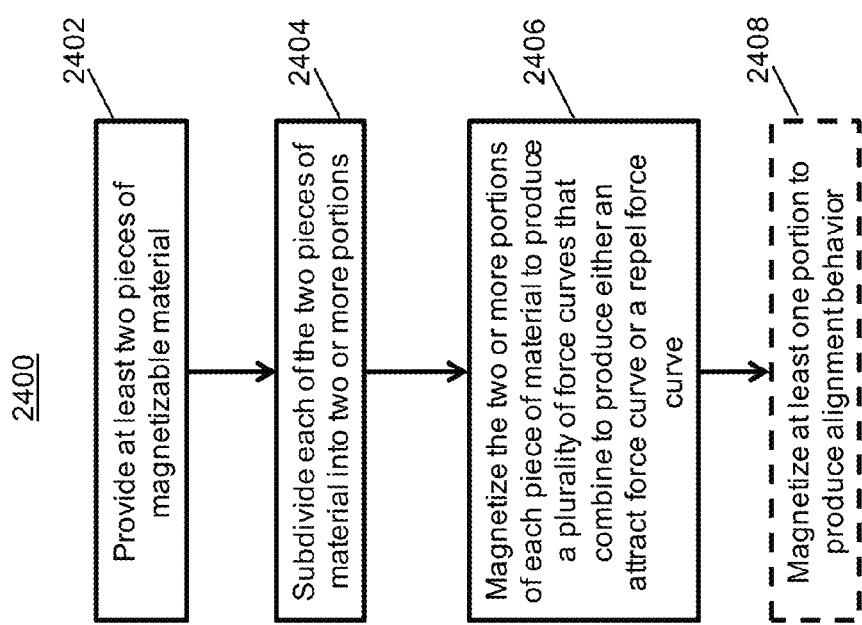
FIG. 24 depicts an exemplary method for producing a magnetic system.

FIG. 24 depicts an exemplary method 2400 for producing a magnetic system comprising providing at least two pieces of magnetizable material (2402), subdividing each of the two pieces of material into two or more portions (2404), magnetizing the two or more portions of each piece of material to produce a plurality of force curves that combine to produce a composite force curve that is an attract force curve or to produce a composite force curve that is a repel force curve (2406), where the composite force curve may have an inflection point. Optionally, magnetize at least one portion of each piece of material to produce an alignment behavior (2408). Under one arrangement, each force curve of the plurality of force curves is an attract force curve. Under another arrangement, each force curve of the plurality of force curves is a repel force curve. Under another arrangement, at least one force curve of the plurality of force curves is an attract force curve and at least one force curve of the plurality of force curves is a repel force curve. One skilled in the art will recognize that the at least two pieces of material may have the same sizes or shapes or may have different sizes or shapes. Moreover, a given portion of a plurality of portions can be subdivided into one or more sub-portions where a given portion or a given sub-portion may be separate from any other portion as long as opposing portions and/or sub-portions produce the corresponding plurality of force curves.

One skilled in the art will understand that cancelling attract forces in the near field with repel forces can impact alignment behavior of the attract forces in the near field resulting from coding of magnetic sources. One skilled in the art will understand that because the smaller magnetic sources in the second portions of the materials have an alternating polarity arrangement, where the number of magnetic sources of a given polarity are the same or about the same than the number of magnetic sources having an opposite polarity, that the magnetic fields corresponding to the smaller magnetic sources will substantially cancel in the far field and therefore not appreciably effect alignment behavior resulting from coding of the magnetic sources in the first portions of the materials. However, as the separation distance between the materials decreases the magnetic fields of the smaller magnetic sources of the second portions of the material can begin to affect the alignment behavior of the larger magnetic sources of the first portions of the materials. As such, it may be desirable to use a movement constraining mechanism with a magnetic system to provide a mechanical alignment mechanism. For example, one or more pins might interact with one or more holes or one of the two pieces of material might be recessed into a cavity, which might have a depth corresponding to a determined effective field cancellation distance or some other distance at which an alignment behavior is determined to no longer be effective.

Figure 25:
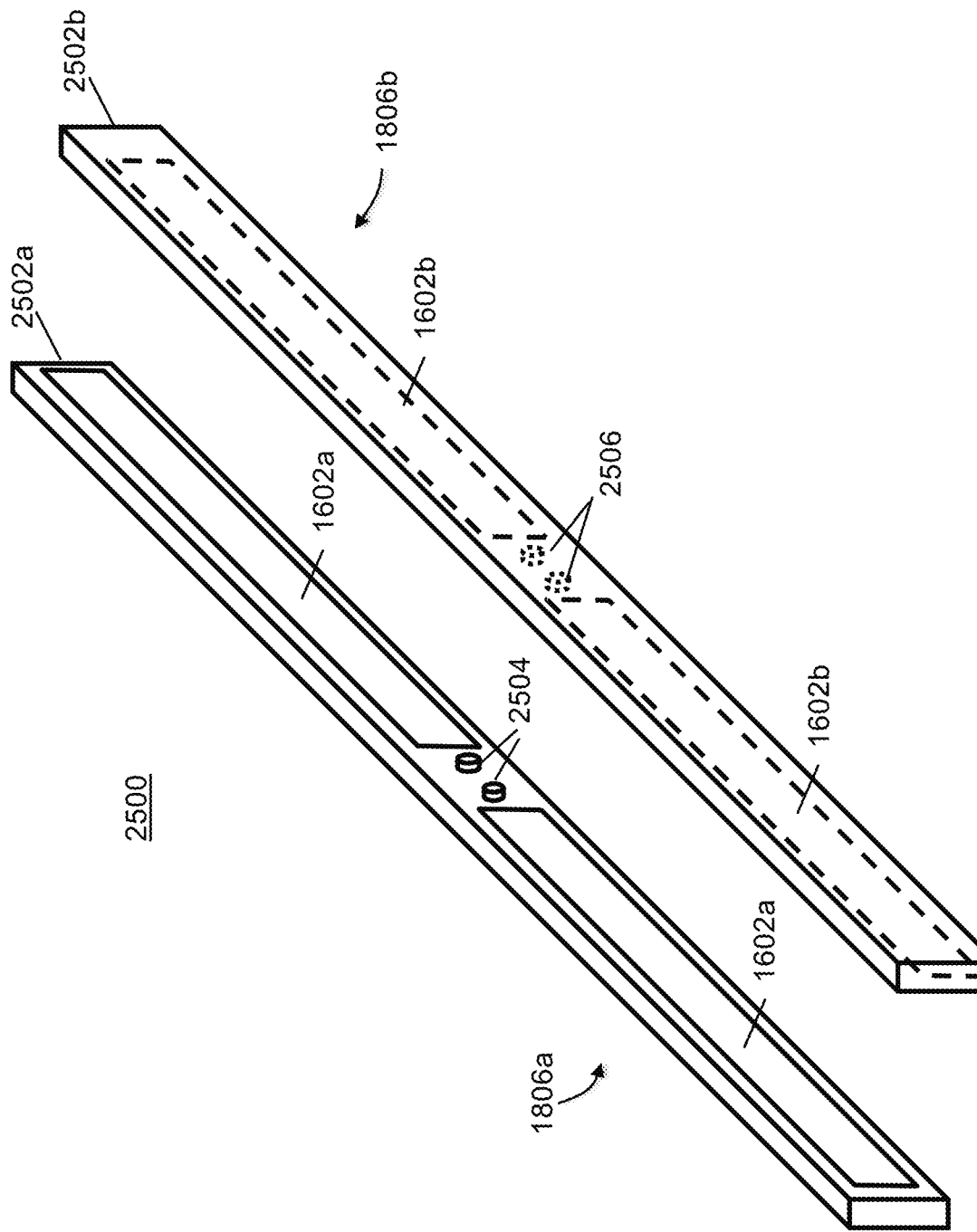
FIG. 25 depicts an exemplary magnetic system comprising an exemplary pair of magnetic systems that are each like the exemplary magnetic system of FIG. 18C.

FIG. 25 depicts an exemplary magnetic system 2500 comprising an exemplary pair of magnetic systems 1806a and 1806b that are each like the exemplary magnetic system 1806 of FIG. 18C. The pair of magnetic systems 1806a and 1806b are configured within two objects 2502a and 2502b (e.g., two pieces of aluminum) in a manner much like the exemplary magnetic system 1608 shown in FIG. 16B, where the first magnetic materials 1602a and the second magnetic materials 1602b of the two magnetic systems 1806a and 1806b are separated by a non-magnetized region. As shown, the first object has two pegs 2504 that will insert into corresponding holes 2506 of the second object when the two objects are brought into alignment and are close enough together such that the pegs 2504 and holes 2506 provide for mechanical alignment of the two objects 2502a and 2502b. The pegs and holes are shown being along a line parallel to an interface boundary between the pair of magnetic systems 1806a and 1806b but could otherwise configured where they also provide for mechanical alignment of the two objects 2502a and 2502b.

Figure 26:
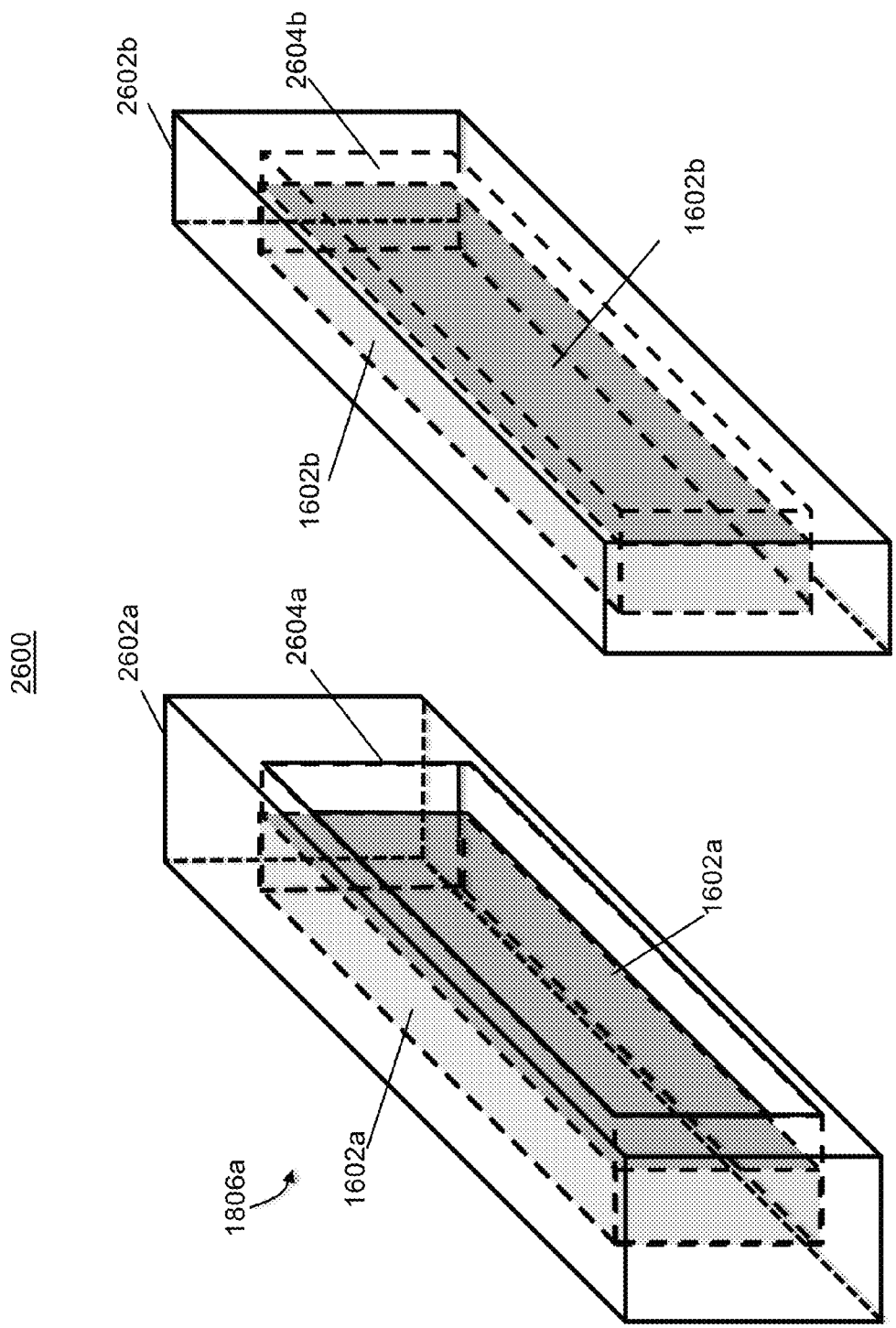
FIG. 26 depicts an exemplary magnetic system comprising an exemplary magnetic system that is like the exemplary magnetic system of FIG. 18C.

FIG. 26 depicts an exemplary magnetic system 2600 comprising an exemplary magnetic system 1806 that is like the exemplary magnetic system 1806 of FIG. 18C. The magnetic system 1806 comprises first and second magnetic materials 1602a and 1602b that are configured within two objects 2602a and 2602b (e.g., two pieces of plastic) having respective recessed areas 2604a and 2604b, where the recessed area 2604a of the first object 2602a is deeper than the thickness of the first magnetic material 1602a and the recessed area 2604b of the second object 2602b is shallower than the thickness of the second magnetic material 1602b. The first magnetic material 1602a is located inside the recessed area 2604a of first object 2602a where there is additional volume within the recessed area 2604a within which a portion of the second magnetic material 1602b can be inserted. The second magnetic material 2602b is partially inside the recessed area 2604b of the second object 2602b, such that a remaining part of the second magnetic material 2602b extends outside the second object 2602b, which can be inserted into the additional volume within the recessed area 2604a of the first object 2602a. As such, the portion of the second magnetic material extending from the second object acts as a male portion and the additional volume within the recessed area 2604*a* acts as a female portion of a male-female coupling that provides for a mechanical alignment of the two objects 2602*a* and 2602*b*.

While particular embodiments of the invention have been described, it will be understood, however, that the invention is not limited thereto, since modifications may be made by those skilled in the art, particularly in light of the foregoing teachings.

The invention claimed is:

1. A magnetic system comprising:
a first multi-pole magnet comprising a first plurality of polarity regions having a first polarity pattern;
a second multi-pole magnet comprising a second plurality of polarity regions having a second polarity pattern;
a third multi-pole magnet comprising a third plurality of polarity regions having a third polarity pattern; and
a fourth multi-pole magnet comprising a fourth plurality of polarity regions having a fourth polarity pattern;
wherein when said first polarity pattern is aligned with said second polarity pattern, said first multi-pole magnet and second multi-pole magnet produce a first composite force curve, said first composite force curve comprising a first force curve with a first extinction rate and a second force curve with a second extinction rate, wherein said first composite force curve is an attract force curve and said first force curve is an attract force curve and said second force curve is a repel force curve and said first extinction rate is greater than said second extinction rate, wherein the first magnetizable material is moveable relative to said second magnetizable material in at least two dimensions for a first portion of said first composite force curve, wherein said first multi-pole magnet is moveable relative to said second multi-pole magnet in only one dimension for a second portion of said first composite force curve, wherein said first multi-pole magnet and said second multi-pole magnet have a direction of magnetization, and wherein said first multi-pole magnet is moveable to said second multi-pole magnet substantially parallel to the direction of magnetization, wherein when said third polarity pattern is aligned with said fourth polarity pattern, said third multi-pole magnet and said fourth multi-pole magnet produce a third magnetic force curve and a fourth magnetic force curve, said third and fourth magnetic force curves combining to produce a second composite force curve, wherein said first and third multi-pole magnets are attached to a first object in a first straight line with a spacing between said first and third multi-pole magnets, and wherein said second and fourth multi-pole magnets are attached to a second object in a second straight line with a spacing between said second and fourth multi-pole magnets, and wherein when said first object and said second object are aligned such that said first straight line is substantially parallel to said second straight line, said first composite force curve and said second composite force curve combining to produce a third composite force curve.

2. The system of claim 1, wherein said third composite force curve further comprises a composite attract force curve having a third extinction rate and a composite repel force curve having a fourth extinction rate, said third extinction rate being greater than said fourth extinction rate.

3. The system of claim 1, wherein said third multi-pole magnet comprises a third polarity pattern, wherein said third polarity pattern corresponds to the first polarity pattern rotated 180 degrees.

4. A magnetic system comprising:
a first portion of a first magnetizable material having a first polarity pattern; and
a second portion of said first magnetizable material having a second polarity pattern, wherein when said first magnetizable material is aligned with a second magnetizable material said first magnetizable material and said second magnetizable material produce magnetic forces in accordance with a repel force curve and a first attract force curve that combine to produce a composite force curve that is a second attract force curve, wherein said second attract force curve comprises an inflection point, wherein said first attract force curve has a first peak attract force and said second attract force curve has a second peak attract force that is less than said first peak attract force, wherein said first magnetizable material is moveable relative to said second magnetizable material in at least two dimensions when in a first portion of said composite force curve.

5. The magnetic system of claim 4, wherein said inflection point comprises a transition from an increasing attract force to a decreasing attract force.

6. The magnetic system of claim 4, wherein said first magnetizable material is movable relative to said second magnetizable material in only one dimension when in a second portion of said composite force curve.

7. The magnetic system of claim 6, further comprising a third magnetizable material and a fourth magnetizable material, wherein said first and third magnetizable materials are disposed in a first straight line, and wherein said second and fourth magnetizable materials are disposed in a second straight line.

8. The magnetic system of claim 7, wherein said first and second magnetizable materials are separated by a first separation distance and said third and fourth magnetizable materials are separated by a second separation distance, and wherein said first and separation distances are substantially the same.

9. The system of claim 7, wherein said third magnetizable material comprises a third polarity pattern, and wherein said third polarity pattern corresponds to the first polarity pattern rotated 180 degrees.

10. A magnetic system comprising:
a first magnetizable material having a first polarity pattern and a second polarity pattern;
and a third magnetizable material having said first polarity pattern and said second polarity pattern, said first magnetizable material and said third magnetizable material each producing a repel force curve and an attract force curve that combine to produce a composite force curve when aligned with a second magnetizable material and a fourth magnetizable material, said first and third magnetizable materials being attached to a first object in a first straight line with a first spacing between said first and third magnetizable materials, said second and fourth magnetizable materials being attached to a second object in a second straight line with a second spacing between said second and fourth magnetizable materials, said first spacing being substantially the same as said second spacing.

11. The magnetic system of claim 10, wherein said first magnetizable material comprises an asymmetric polarity pattern.

12. The magnetic system of claim 11, wherein said second magnetizable material comprises an asymmetric polarity pattern.

13. The magnetic system of claim 10, wherein said first magnetizable material comprises an unbalanced polarity pattern.

14. The magnetic system of claim 13, wherein said second magnetizable material comprises an asymmetric polarity pattern.

15. The system of claim 10, wherein said first and second polarity patterns of said third magnetizable material are rotated 180 degrees relative to said first and second polarity patterns of said first magnetizable material.

16. A magnetic system comprising:
  a first magnetizable material comprising a first portion having a first polarity pattern and a second portion having a second polarity pattern;
  and a third magnetizable material having said first polarity pattern and said second polarity pattern, said first magnetizable material and said third magnetizable material each producing a repel force curve and an attract force curve that combine to produce a composite force curve when aligned with a second magnetizable material and a fourth magnetizable material, said first and third magnetizable materials being attached to a first object in a first straight line with a first spacing between said first and third magnetizable materials, said second and fourth magnetizable materials being attached to a second object in a second straight line with a second spacing between said second and fourth magnetizable materials, said first spacing being substantially the same as said second spacing, said first and second polarity patterns of said third magnetizable material being rotated 180 degrees relative to said first and second polarity patterns of said first magnetizable material, and wherein each of said first and second magnetizable materials comprise asymmetric polarity patterns, and wherein each of said first and second magnetizable materials comprise unbalanced polarity patterns, and wherein said first object and said second object are moveable in at least two dimensions when in a first portion of said composite force curve and wherein said first object and said second object are moveable in only one dimension when in a second portion of said composite force curve, and wherein said attract force curve comprises a first peak attract force and wherein said composite force curve comprises a second peak attract force, and wherein said first peak attract force is greater than said second peak attract force.

\* \* \* \* \*